(12) United States Patent
Swaine et al.

(10) Patent No.: US 7,020,768 B2
(45) Date of Patent: Mar. 28, 2006

(54) APPARATUS AND METHOD FOR FACILITATING DEBUGGING OF SEQUENCES OF PROCESSING INSTRUCTIONS USING CONTEXT IDENTIFIER COMPARISON

(75) Inventors: Andrew Brookfield Swaine, Welwyn Garden (GB); Conrado Blasco Allué, Cherry Hinton (GB); Ian Victor Devereux, Fulbourn (GB); David James Williamson, Austin, TX (US); Anthony Neil Berent, Stapleford (GB)

(73) Assignee: ARM Limited, Cambridge (GB)

( * ) Notice: Subject to any disclaimer, the term of this patent is extended or adjusted under 35 U.S.C. 154(b) by 342 days.

(21) Appl. No.: 09/792,643

(22) Filed: Feb. 26, 2001

(65) Prior Publication Data
US 2002/0184477 A1 Dec. 5, 2002

Related U.S. Application Data

(63) Continuation-in-part of application No. 09/773,387, filed on Feb. 1, 2001.

(51) Int. Cl.
G06F 9/44 (2006.01)
G06F 11/36 (2006.01)
(52) U.S. Cl. .................... 712/228; 712/227
(58) Field of Classification Search ............... 712/227, 712/228
See application file for complete search history.

(56) References Cited
U.S. PATENT DOCUMENTS
4,439,827 A * 3/1984 Wilkes .................. 712/235
4,590,550 A 5/1986 Eilert
(Continued)

FOREIGN PATENT DOCUMENTS
EP 0 324 308 7/1989
(Continued)

OTHER PUBLICATIONS
John L. Hennessy and David A. Patterson, Computer Organization and Design—The Hardware/Software Interface, Morgan Kaufman Publishers, Inc., Second Edition, 1998, p. 351.*
(Continued)

*Primary Examiner*—Daniel H. Pan
(74) *Attorney, Agent, or Firm*—Nixon & Vanderhye P.C.

(57) ABSTRACT

The present invention provides an apparatus and method for facilitating debugging of sequences of processing instructions. The apparatus comprises a processing circuit for executing processing instructions, the processing circuit having multiple states of operation, with each state of operation being assigned a context identifier to identify the state of operation. Further, logic is provided for facilitating debugging of sequences of processing instructions executed by the processing circuit. The logic comprises control logic, responsive to control parameters, to perform predetermined actions to facilitate debugging, and triggering logic for generating the control parameters dependent on data received from the processing circuit indicative of the processing being performed by the processing circuit. The triggering logic comprises at least one context identifier comparator for comparing a context identifier provided within the data received from the processing circuit with a predetermined context identifier, and to generate a signal indicating whether that context identifier matches the predetermined context identifier. By this approach, the present invention enables a data processing apparatus to be provided with tracing mechanisms and/or debugging mechanisms which can reliably operate even in situations where the sequences of processing instructions from different states of operation occupy overlapping regions in the memory's address space.

25 Claims, 9 Drawing Sheets

U.S. PATENT DOCUMENTS

| | | | |
|---|---|---|---|
| 4,794,521 A * | 12/1988 | Ziegler et al. | 711/130 |
| 4,821,178 A | 4/1989 | Levin et al. | |
| 5,151,981 A | 9/1992 | Westcott et al. | |
| 5,347,647 A | 9/1994 | Allt et al. | |
| 5,355,487 A * | 10/1994 | Keller et al. | 717/127 |
| 5,550,974 A | 8/1996 | Pennington et al. | |
| 5,555,392 A | 9/1996 | Chaput et al. | |
| 5,802,273 A | 9/1998 | Levine et al. | |
| 5,923,872 A | 7/1999 | Chrysos et al. | |
| 5,978,742 A | 11/1999 | Pickerd | |
| 5,987,598 A | 11/1999 | Levine | |
| 6,000,044 A | 12/1999 | Chrysos et al. | |
| 6,009,270 A | 12/1999 | Mann | |
| 6,035,422 A * | 3/2000 | Hohl et al. | 714/35 |
| 6,052,802 A | 4/2000 | Zahir et al. | |
| 6,067,644 A | 5/2000 | Levine et al. | |
| 6,134,652 A * | 10/2000 | Warren | 712/227 |
| 6,139,198 A | 10/2000 | Danforth et al. | |
| 6,175,913 B1 * | 1/2001 | Chesters et al. | 712/227 |
| 6,359,502 B1 | 3/2002 | Endou | |
| 6,374,367 B1 * | 4/2002 | Dean et al. | 714/37 |
| 6,415,378 B1 | 7/2002 | Davidson et al. | |
| 6,574,727 B1 | 6/2003 | Davidson et al. | |

FOREIGN PATENT DOCUMENTS

| | | |
|---|---|---|
| EP | 0 465 765 | 1/1992 |
| EP | 0 503 514 | 9/1992 |
| EP | 0 689 141 | 12/1995 |
| EP | 0 919 919 | 6/1999 |
| GB | 2 307 072 | 5/1997 |
| JP | 62-40538 | 2/1987 |

OTHER PUBLICATIONS

Dictionary.com definition of "operating system", http://dictionary.reference.com/search?q=operating%20system, The American Heritage Dictionary of the English Language, Fourth Edition, 2000, Houghton Mifflin Company.*

ARM966E-S Technical Reference Manual, Dec. 1999, Arm Limited, Issue A, Chapter 1.

Embedded Trace Macrocell Architecture Specification, Dec. 2002, Arm Limited, Issue 1, Chapters 1 and 2 and Appendix B.

Uhlig et al., Trace-Driven Memory Simulation: A Survey, Jun. 1997, ACM Computing Surveys, vol. 29, No. 2, pp. 128-170.

ARM IHI 0014 Revision C—Embedded Trace Macrocell Specification.

ARM DDI 0157F—ETM9 (Rev. 1) Technical Reference Manual.

ARM DDI 0158D-ETM7 (Rev. 1) Technical Reference Manual.

U.S. Appl. No. 09/876,220, filed Jun. 8, 2001.

ARM IHI 0014 Revision I-Embedded Trace Macrocell Spec.

* cited by examiner

APPARATUS AND METHOD FOR FACILITATING DEBUGGING OF SEQUENCES OF PROCESSING INSTRUCTIONS USING CONTEXT IDENTIFIER COMPARISON

This application is a continuation-in-part of application Ser. No. 09/773,387, filed 1 Feb. 2001, the entire content of which is hereby incorporated by reference in this application.

FIELD OF THE INVENTION

The present invention relates to data processing systems. More particularly, the invention relates to data processing systems providing mechanisms for facilitating debugging of sequences of processing instructions executed by the data processing system.

BACKGROUND

As data processing systems increase in complexity whilst it is desired to also reduce development time for new systems, there is a need to improve the debug and tracing tools and mechanisms that may be used within the development of data processing systems.

Tracing the activity of a data processing system whereby a trace stream is generated including data representing the step-by-step activity within the system is a highly useful tool in system development. However, with the general move towards more deeply embedded processor cores, it becomes more difficult to track the state of the processor core via externally accessible pins. Accordingly, off-chip tracing mechanisms for capturing and analyzing trace data and increased amounts of tracing functionality are being placed on-chip. Examples of such on-chip tracing mechanisms are the Embedded Trace Macrocell provided by ARM Limited, Cambridge, England in association with their ARM7 and ARM9 processors. Such tracing mechanisms produce in real time a trace stream of data representing activities of the data processing system that are desired to be traced. This trace stream can then subsequently be used to facilitate debugging of sequences of processing instructions being executed by the data processing system.

Another process that is used to facilitate debugging of processing instructions executed by the data processing system involves the inclusion of debugging mechanisms which are used to detect predetermined events, and which upon detection of such a predetermined event are arranged to cause the data processing system to halt execution to enable debugging to be performed. Such debugging mechanisms are clearly more invasive than tracing mechanisms, but both mechanisms are useful for facilitating debugging of sequences of processing instructions during the development of data processing systems.

It is known to provide tracing and debugging mechanisms incorporating trigger points that serve to control the tracing and debugging operation, such as starting or stopping tracing upon access to a particular register, address or data value. Such mechanisms are very useful for diagnosing specific parts of a system or types of behaviour. As an example, if a particular system bug is associated with exception behaviour, then tracing the full operation of the system would produce an inconveniently large volume of data when what is really required is tracing of the exception behaviour with this being triggered upon access to the appropriate exception handling vector.

The sequences of processing instructions executed by the data processing system are typically placed in a memory, with the memory having a predefined address space. The processor core of the data processing system may have multiple states of operation, with each state of operation requiring a number of sequences of processing instructions. Often, the memory's address space is not large enough to hold all instructions and data required by the processor core, and accordingly it is common for sequences of data processing instructions to be swapped in and out of the memory, dependent on the state of operation of the processor core. In such situations, it is possible that sequences of processing instructions from different states of operation may occupy overlapping regions in the address space.

It will be appreciated that it is difficult to reliably operate such tracing and debugging mechanisms in situations where processing instructions may occupy overlapping regions in the address space, since it is difficult to reliably identify trigger points based on instruction addresses. When using debugging mechanisms, this may result in the data processing system halting execution unnecessarily in certain instances, whereas when employing tracing mechanisms to facilitate subsequent debugging, such situations may result in more data being traced than is actually required, or unintended data being traced in place of that which was intended.

Accordingly, it would be desirable to provide a system and method which provides for improved tracing and debugging in such data processing systems.

SUMMARY

Viewed from a first aspect, the present invention provides an apparatus for processing data, said apparatus comprising: a processing circuit for executing processing instructions, the processing circuit having multiple states of operation, with each state of operation being assigned a context identifier to identify the state of operation, and logic for facilitating debugging of sequences of processing instructions executed by the processing circuit: the logic comprising: control logic, responsive to control parameters, to perform predetermined actions to facilitate debugging; and triggering logic for generating the control parameters dependent on data received from the processing circuit indicative of the processing being performed by the processing circuit, the triggering logic comprising at least one context identifier comparator for comparing a context identifier provided within the data received from the processing circuit with a predetermined context identifier, and to generate a signal indicating whether that context identifier matches the predetermined context identifier.

In accordance with the present invention, a data processing apparatus is provided with a processing circuit for executing processing instructions, the processing circuit having multiple states of operation. Each state of operation is assigned a context identifier to identify the state of operation. In preferred embodiments, the context identifier will be defined and set by the operating system.

Further, the present invention provides logic for facilitating debugging of sequences of processing instructions executed by the processing circuit. This logic comprises control logic for performing predetermined actions to facilitate debugging in response to control parameters. For example, in a tracing implementation, the control logic may be arranged to generate a stream of trace data which can then be used subsequently during debugging, whilst in a debugging implementation the control circuit may be arranged to cause the processing circuit to halt execution in response to a predetermined control parameter.

The logic of the present invention also incorporates triggering logic for generating the control parameters dependent on data received from the processing circuit indicative of the processing being performed by the processing circuit. In accordance with the present invention, this triggering logic comprises at least one context identifier comparator for comparing a context identifier provided within the data received from the processing circuit with a predetermined context identifier, and to generate a signal indicating whether the context identifier matches the predetermined context identifier.

By this approach, the present invention enables a data processing apparatus to be provided with tracing mechanisms and/or debugging mechanisms which can more reliably operate even in situations where the sequences of processing instructions from different states of operation occupy overlapping regions in the memory's address space.

In a first implementation of the invention, the logic is a tracing circuit, the control logic being operable to generate a stream of trace data from the data received from the processing circuit in dependence on the control parameters from the triggering logic.

In such an implementation, the triggering logic preferably further comprises at least one address comparator for comparing an address provided within the data received from the processing circuit with a predetermined address and to generate an output signal indicating whether that address matches the predetermined address, the triggering logic further including conditioning logic to optionally enable the output signal from the address comparator to be conditioned on the output of one of said at least one context identifier comparators, such that a signal indicating a match of the address will only be output from the conditioning logic if a match of the context identifier was also indicated by the context identifier comparator.

By this approach, a reliable trigger point can be set up for a predetermined processing instruction, since the triggering logic will not just be looking for a predetermined instruction address, but for the presence of that predetermined instruction address in a predetermined state of operation of the processing circuit as defined by the context identifier.

In one embodiment of the present invention, the apparatus comprises a plurality of said context identifier comparators, and a plurality of said address comparators with associated conditioning logic to enable those address comparators to have their output signal conditioned on the output of one of said context identifier comparators. Each context identifier comparator may be associated with a predetermined one of said address comparators. In such embodiments, there will be a fixed relationship between context identifier comparators and address comparators. Certain embodiments may provide the same number of context identifier comparators as address comparators, although typically there will tend to be less context identifier comparators than address comparators, since typically not all addresses being tracked will relate to different states of operation.

Alternatively, rather than there being a fixed relationship between context identifier comparators and address comparators, each address comparator may have a selector associated therewith arranged to receive the output from multiple of said context identifier comparators, the selector being driven by a select signal to determine which context identifier comparator's output is to be used to condition the output of the associated address comparator. This provides more flexibility as to how the outputs from the various context identifier comparators are used to condition the output from the various address comparators.

As an alternative to providing context identifier comparators separately to the address comparators, it is also possible that address comparators can be arranged to be used as context identifier comparators in certain modes of operation. Accordingly, in accordance with one embodiment of the present invention, the apparatus comprises a plurality of said address comparators, at least one of the address comparators including mode change logic to enable that address comparator to be used as said context identifier comparator to generate an output used to condition the output signal from another of said address comparators. Preferably, the mode change logic comprises a multiplexer arranged to receive an address and a context identifier provided within the data received from the processing circuit, and to select the context identifier if the address comparator is to be used as a context identifier comparator.

In alternative implementations of the present invention, the logic facilitating debugging of sequences of processing instructions may take the form of a debugging mechanism provided within the data processing apparatus, rather than the above described tracing mechanism. Accordingly, in such implementations, the triggering logic comprises one or more logic circuits used to detect predetermined events, the control circuit being arranged to cause the processing circuit to halt execution of a current sequence of processing instructions to enable debugging to be performed.

One type of debug procedure is known as a software debug. If software debug is used, then in preferred embodiments the control logic is arranged to further cause the processing circuit to execute an alternative sequence of processing instructions in order to perform debugging.

In embodiments of the present invention, it is possible for the output signal from a particular context identifier comparator to be used directly to generate a control parameter actioned by the control logic. Hence, in the software debug example, the presence of a particular state of operation of the processing circuit may be detected by a context identifier comparator to cause a control parameter (in this case a breakpoint signal) to be issued directly, thereby causing the control logic to invoke the alternative sequence of processing instructions, namely the software exception handler. Since the context identifier giving rise to execution of the alternative sequence of processing instructions will still be present, then it is clear that a problem may arise, namely that an infinite loop of branches to the software exception handler could occur as the context identifier comparator continues to generate a breakpoint signal each time the software exception handler begins execution.

To avoid this problem, in preferred embodiments, if the predetermined context identifier within the context identifier comparator identifies a state of operation of the processor upon detection of which it is desired to invoke the alternative sequence of processing instructions, the alternative sequence of processing instructions being arranged to execute in a privileged mode of the processor, then on determination of a match by the context identifier comparator, the triggering logic is arranged to generate a control parameter provided that the processor is not in the privileged mode, the control logic being responsive to the control parameter to cause the processing circuit to execute the alternative sequence of processing instructions to perform debugging.

In preferred embodiments, this function is implemented by preventing the context identifier comparator from generating a match signal if it is being used in isolation (i.e. without further qualification by an address comparator), if software debug is enabled, and if the processing circuit is operating in a privileged mode of operation (the privileged mode of operation being, the mode of operation in which the software exception handler is executed).

In preferred embodiments, the triggering, logic further comprises a plurality of address comparators for comparing an address provided within the data received from the processing circuit with a predetermined address and to generate an output signal indicating whether that address matches the predetermined address, the triggering logic further including conditioning logic to enable the output signal from the address comparator to be conditioned on the output of one of said at least one context identifier comparators, such that a signal indicating a match of the address will only be output from the conditioning logic if a match of the context identifier was also indicated by the context identifier comparator.

Further, in one embodiment, at least one of the address comparators includes mode change logic to enable that address comparator to be used as said context identifier comparator to generate an output used to condition the output signal from another of said address comparators. The mode chance logic preferably comprises a multiplexer arranged to receive an address and a context identifier provided within the data received from the processing circuit, and to select the context identifier if the address comparator is to be used as a context identifier comparator.

In one implementation, the processing circuit operates in a multiple-tasking environment, and the multiple states of operation are multiple processes. However, in alternative embodiments, the processing circuit operates in a single tasking environment using processing instructions received from a memory, the address space of the memory using overlays to enable sequences of processing instructions to occupy overlapping regions in the address space, and the state of operation identifying, the overlay or combination of overlays being used.

Viewed from a second aspect, the present invention provides a method of facilitating debugging of sequences of processing instructions executed by a processing circuit, the processing circuit having multiple states of operation, with each state of operation being assigned a context identifier to identify the state of operation, said method comprising the steps of: (i) employing triggering-logic to generate control parameters dependent on data received from the processing circuit indicative of the processing being performed by the processing circuit; (ii) utilising within the triggering logic at least one context identifier comparator to compare a context identifier provided within the data received from the processing circuit with a predetermined context identifier, and to generate a signal indicating whether that context identifier matches the predetermined context identifier; and (iii) responsive to the control parameters generated by the triggering logic, performing predetermined actions to facilitate debugging.

Viewed from a third aspect, the present invention provides a computer program product carrying a computer program for controlling an apparatus in accordance with the method of the second aspect of the present invention.

BRIEF DESCRIPTION OF THE DRAWINGS

The present invention will be described further, by way of example only, with reference to a preferred embodiment thereof as illustrated in the accompanying drawings, in which.

DETAILED DESCRIPTION

Figure 1:
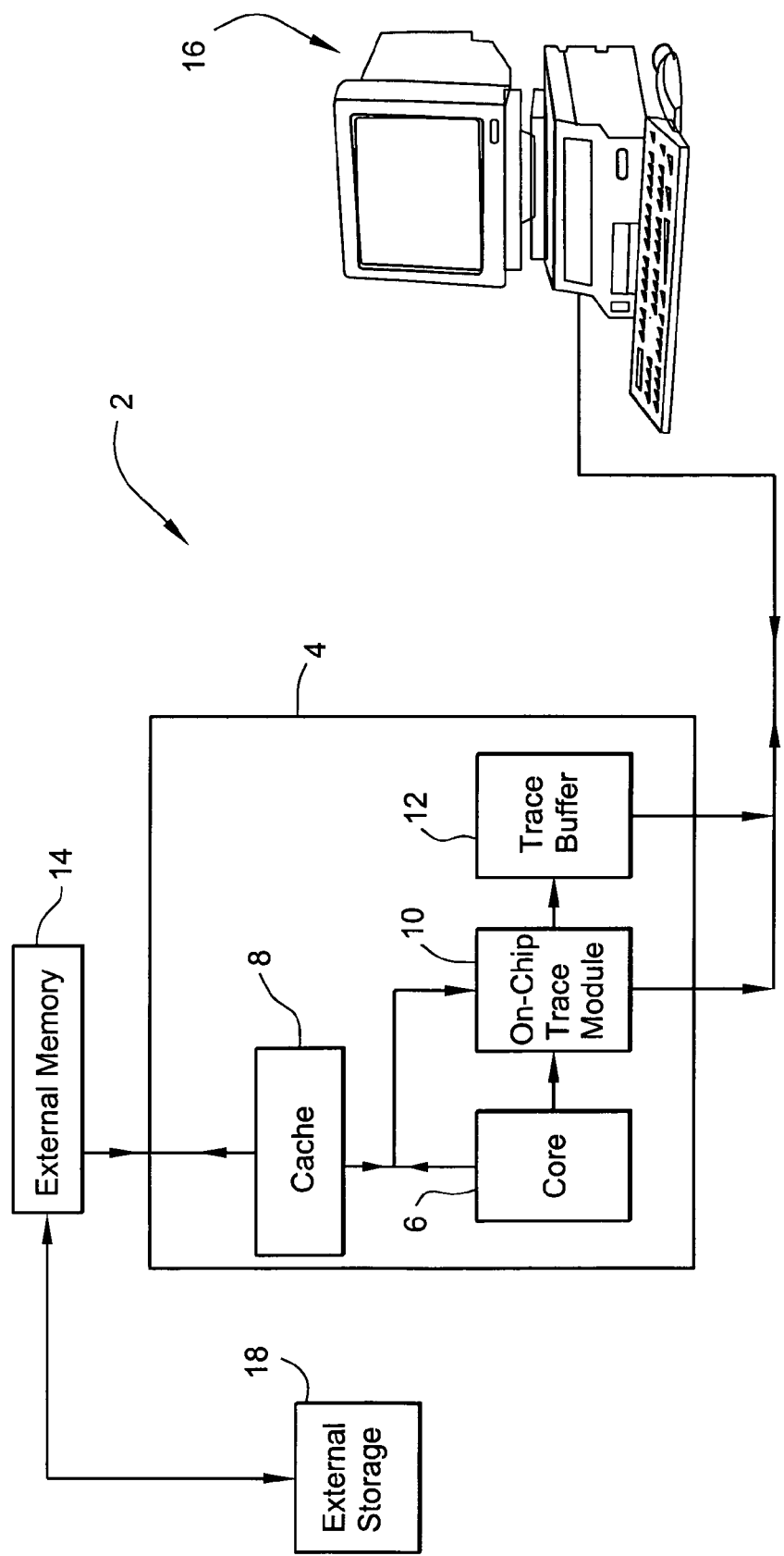
FIG. 1 schematically illustrates a data processing system providing on-chip tracing mechanisms.

FIG. 1 schematically illustrates a data processing system 2 providing an on-chip tracing mechanism. An integrated circuit 4 includes a microprocessor core 6, a cache memory 8, an on-chip trace module controller 10 and an on-chip trace buffer 12. The integrated circuit 4 is connected to an external memory 14 which is accessed when a cache miss occurs within the cache memory 8. A general purpose computer 16 is coupled to the on-chip trace module controller 10 and the on-chip trace buffer 12 and serves to recover and analyse a stream of tracing data from these elements using software executing upon the general purpose computer 16.

It is often the case that the processor core 6 may, during operation, need to access more data processing instructions and data than there is actually space for in the external memory 14. For example, the external memory 14 may have a size of 1 MB, whereas the processor core 6 might typically be able to specify 32-bit addresses, thereby enabling 4 GB of instructions and data to be specified. Accordingly, all of the instructions and data required by the processor core 16 are stored within external storage 18, for example a hard disk, and then when the processor core 6 is to operate in a particular state of operation, the relevant instructions and data for that state of operation are loaded into the external memory 14.

In one embodiment, the processor core 6 may operate in a single tasking environment. For any particular state of operation of the processor core 6 in such situations, an overlay or combination of overlays identify the relevant instructions and data within the address space of the external memory 14. The context identifier in such cases identifies the particular state of operation, and hence identifies the overlay or combination of overlays being used.

In a multi-tasking environment, the external memory 14 will typically include mappings from virtual to physical addresses, with the mappings changing dependent on the state of operation of the processor core 6, i.e. which process is operating on the processor core 6. Hence, in the multi-tasking environment, the context identifiers effectively identify the mapping being used by the external memory 14.

Figure 2:
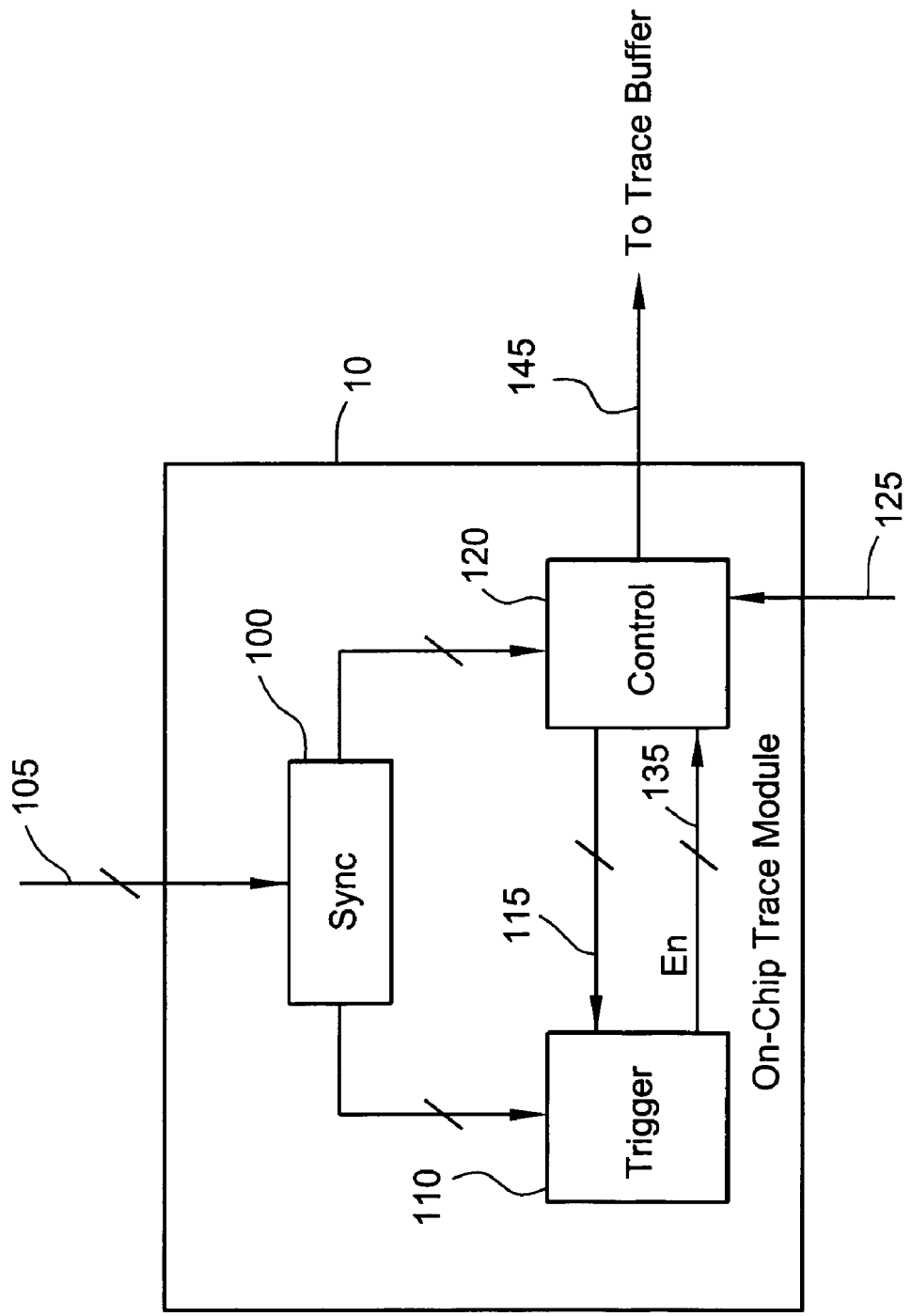
FIG. 2 is a block diagram illustrating in more detail the elements provided within the on-chip trace module of FIG. 1.

FIG. 2 is a block diagram illustrating in more detail the components provided within the on-chip trace module of FIG. 1. The on-chip trace module 10 is arranged to receive over path 105 data indicative of the processing being performed by the processor core 6. With reference to FIG. 1, this may be received from the bus connecting the core 6, cache 8, and on-chip trace module 10, along with additional control-type data received directly from the core (for example, an indication that the instruction address is being indexed, an indication that a certain instruction failed its condition codes for some reason, etc).

The sync logic 100 is arranged to convert the incoming signals into internal versions of the signals more appropriate for use within the on-chip trace module. These internal versions are then sent to the trigger 110 and the control logic 120, although it will be appreciated that the trigger 110 and the control logic 120 will not necessarily need to receive the same signals. Fundamentally, the trigger 110 needs to receive data relating to triggerable events, for example instruction addresses, context identifiers, etc. The control logic 120 needs to receive any data that would need to be traced dependent on the control parameters issued by the trigger 110. The control block 120 is further arranged to receive configuration information over path 125 from the general purpose computer 16, and is arranged to then issue signals over path 115 to the trigger 110 in order to set up the trigger logic configuration.

Whenever the trigger 110 detects events which should give rise to the generation of a trace stream, it sends an enable signal over path 135 to the control logic 120 to turn the trace on and off. The control logic reacts accordingly by outputting the necessary trace data to the trace buffer over path 145. It will be appreciated that a variety of enable signals may be provided over path 135, to identify the type of signals which should be traced, for example trace only instructions, trace instructions and data, etc.

Figure 3:
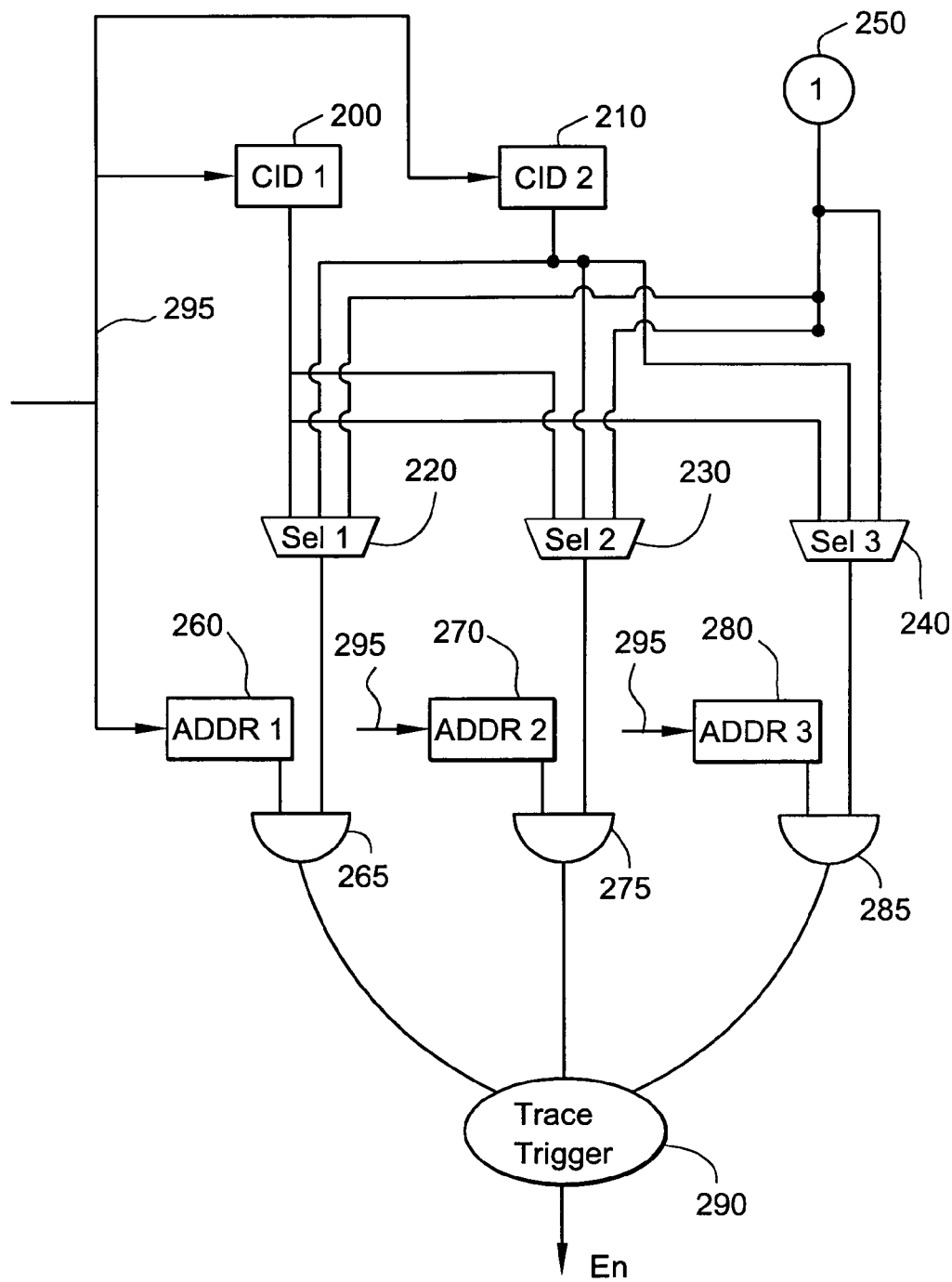
FIG. 3 schematically illustrates the use of context identifier comparators in accordance with a first embodiment of the present invention.

FIG. 3 is a block diagram illustrating one embodiment of the present invention in which context identifier comparators (hereafter referred to as CID comparators) are used to condition the output from a number of address comparators within the trigger circuit 110. As shown in FIG. 3, three address comparators 260, 270 and 280 are provided along with two CID comparators 200 and 210, these address comparators and CID comparators being arranged to receive over path 295 the data output by the sync logic 100 to the trigger circuit 110.

Each CID comparator 200, 210 is arranged to compare CID data provided over path 295 with a predetermined CID stored within the CID comparator, and to output a signal indicating whether a match has been detected. For the purpose of describing a preferred embodiment, it will be assumed that a logic zero level signal is output if there is no match, whereas a logic one level signal is output if there is a match.

The output of each CID comparator 200, 210 is input to each of three multiplexers 220, 230 and 240. Each of the multiplexers 220, 230 and 240 also receives a logic one signal from a source 250. The multiplexers 220, 230 and 240 are associated with corresponding address comparators 260, 270, 280, respectively, and their output is used to condition the output from the associated address comparator via the corresponding AND gates 265, 275 and 285.

For example, if address comparator 260 generates a match signal at a logic one level, indicating that the address input over path 295 matches the address stored within the address comparator, then that match signal will only be output to the trace trigger circuitry 290 if a logic one signal is also received by the AND gate 265 from the multiplexer 220. The multiplexer 220 will output the input signal from either CID comparator 200, CID comparator 210 or the source 250, dependent on the value of a select signal input to the multiplexer 220. If it is determined that the output of the address comparator 260 should not be conditioned upon the output from either of the two CID comparators, then the select signal input to the multiplexer 220 will cause it to output the logic one value input from source 250, thereby ensuring that the output from the AND gate 265 always replicates the output from the address comparator 260. Alternatively, the select signal 220 can be used to ensure that the output from either CID comparator 200 or CID comparator 210 is output to the AND gate 265, thereby enabling the output from the address comparator 260 to be conditioned upon the output of either CID comparator.

It will be appreciated from FIG. 3 that exactly the same flexibility is provided with respect to the other two address comparators 270, 280, and hence this approach provides a great deal of flexibility as to how the output from each address comparator is conditioned. In effect, the output of each address comparator can be conditioned optionally based on one of one or more CID comparators, shared between all of the address comparators.

The trigger circuitry 290 can be configured to generate an appropriate enable signal to the control logic 120 based on an arbitrarily complex function of its input signals (for example start tracing when output from AND gate 265 is high, stop tracing when output from AND gate 275 is high, etc.).

Figure 4:
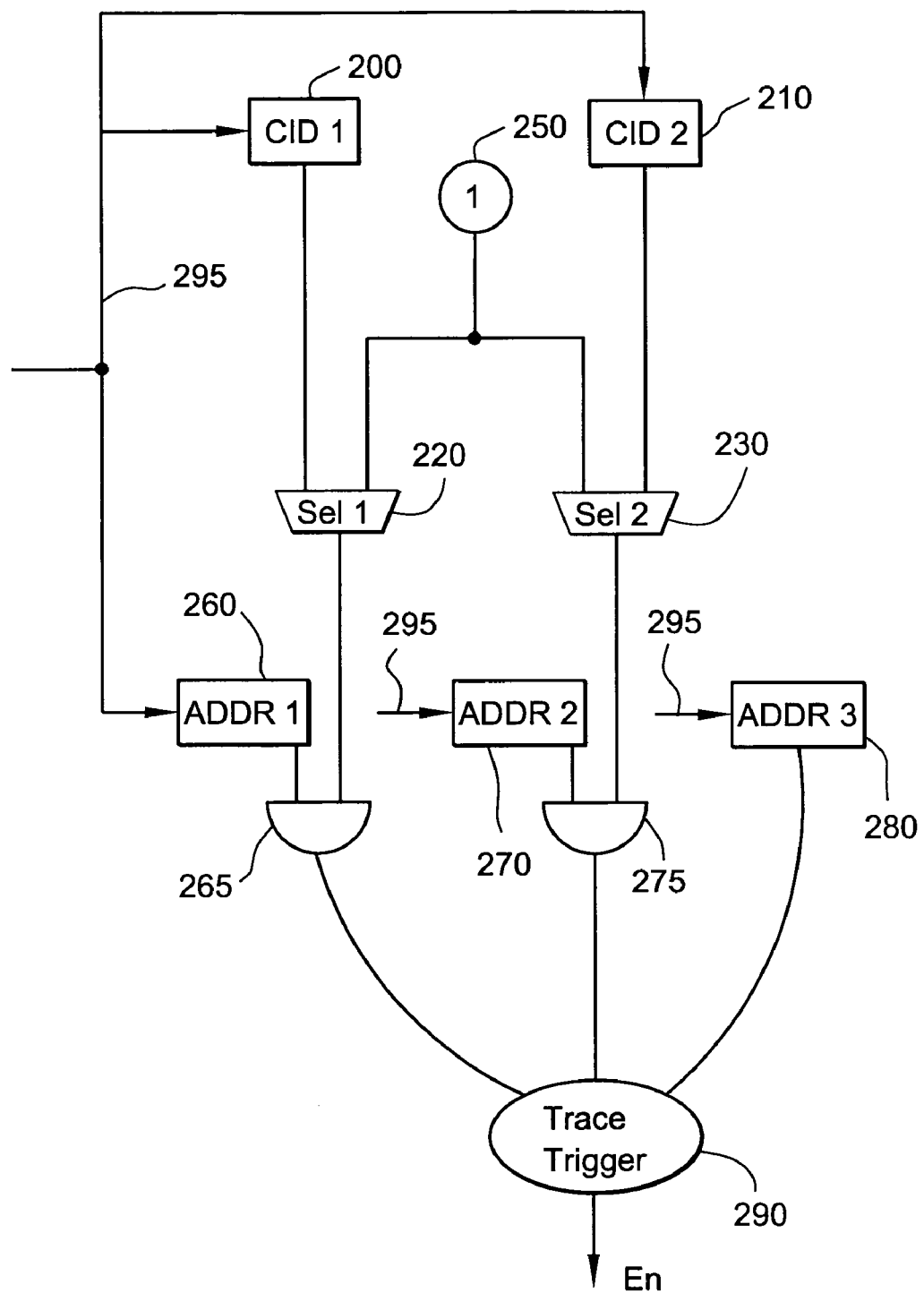
FIG. 4 illustrates the use of context identifier comparators in accordance with a second embodiment of the present invention.

FIG. 4 illustrates an alternative embodiment to FIG. 3, where the mapping of CID comparators to address comparators is fixed. In this example, the address comparator 260 can only be conditioned on the basis of the output from CID comparator 200. This conditioning can still be overridden by selection of the logic one value from source 250. Similarly, address comparator 270 can have its output conditioned by the output from CID comparator 210 if desired. In this embodiment address comparator 280 does not have its output conditioned by the output of either CID comparator 200, 210, although it will be appreciated that the circuit could be arranged such that this address comparator also has its output conditioned based on a fixed one of the two CID comparators.

As with the circuit of FIG. 3, the trace trigger circuit 290 of FIG. 4 will be arranged to generate an appropriate enable signal to the control logic 120 dependent on its inputs.

Figure 5:
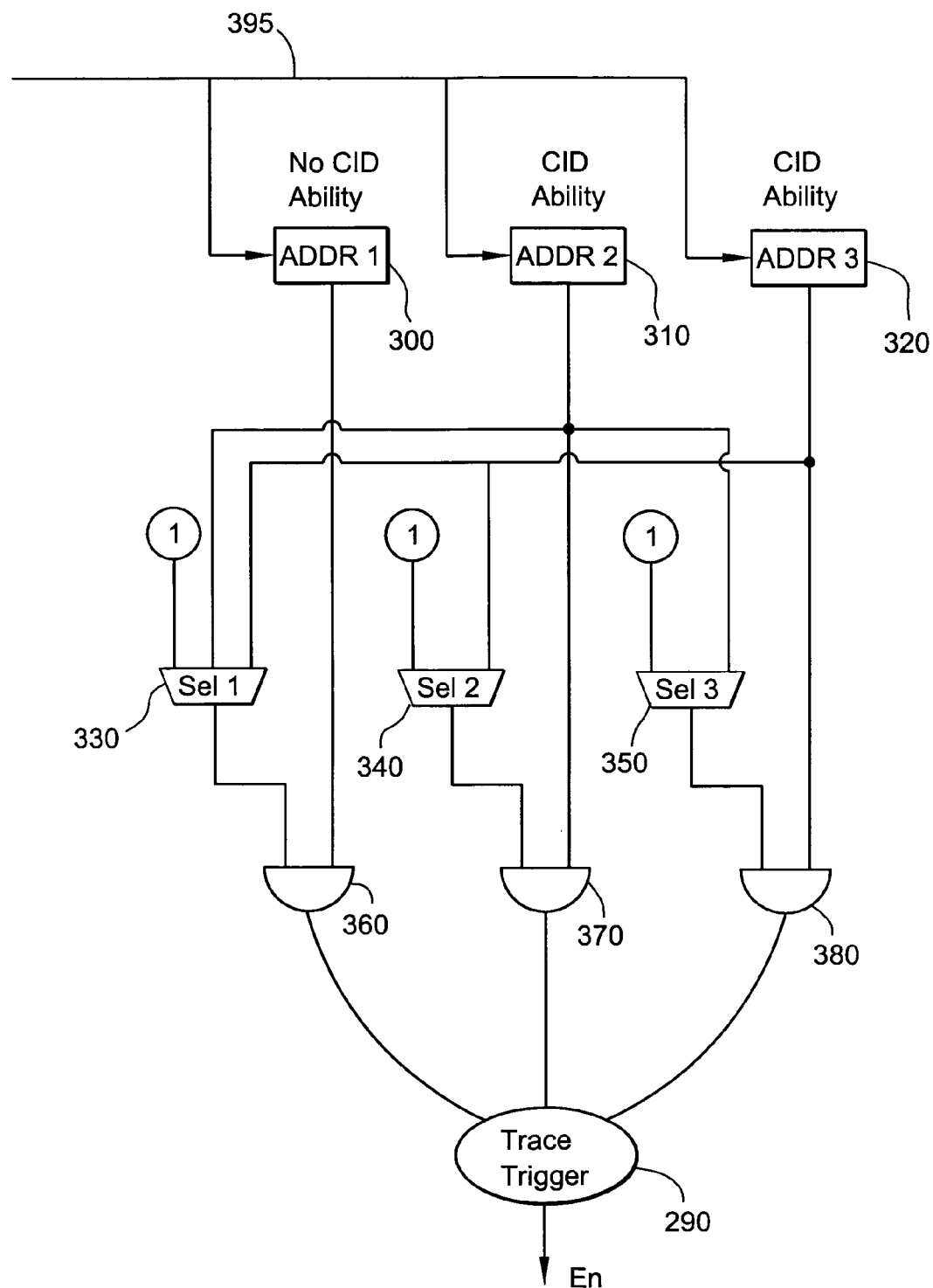
FIG. 5 illustrates an embodiment where address comparators may be used in certain modes of operation as context identifier comparators.

FIG. 5 illustrates an alternative embodiment of circuitry within the trigger circuit 110, where instead of separate CID comparators and address comparators, certain of the address comparators are provided with additional functionality to enable them to operate as CID comparators in certain modes of operation.

In the particular example in FIG. 5, it is assumed that address comparator 300 has no CID comparator ability, whereas both address comparators 310 and 320 do have CID comparator ability. Associated with each address comparator 300, 310, 320 is an AND gate 360, 370, 380, respectively, which is arranged to receive the output from its associated address comparator. Each AND gate is also arranged to receive as an input the output from a corresponding multiplexer 330, 340 and 350. These multiplexers are arranged to receive as one of their inputs a logic one value, to enable any conditioning of the corresponding address comparator to be turned off. In addition, each multiplexer is arranged to receive the output from any of the address comparators (other than its corresponding address comparator) that may operate as a CID comparator. Accordingly, selector 330 receives the outputs from address comparators 310 and 320, selector 340 receives the output from address comparator 320, and selector 350 receives the output from address comparator 310.

Hence, if, for example, the output from address comparator 300 were to be conditioned on the output from address comparator 310 when operating as a CID comparator, then the address comparator 310 would receive a signal indicating that it should operate in CID comparison mode, and the multiplexer 330 would receive a select signal indicating that it should output the signal received from address comparator 310. The address comparator 310 would then compare any CID received with a stored CID within the address comparator 310 and output a match signal accordingly. In the event of a CID match by address comparator 310, and an address match by address comparator 300, then AND gate 360 would be arranged to output a logic one signal to the trace trigger circuit 290, causing a suitable trace enable signal to be issued.

Figure 6:
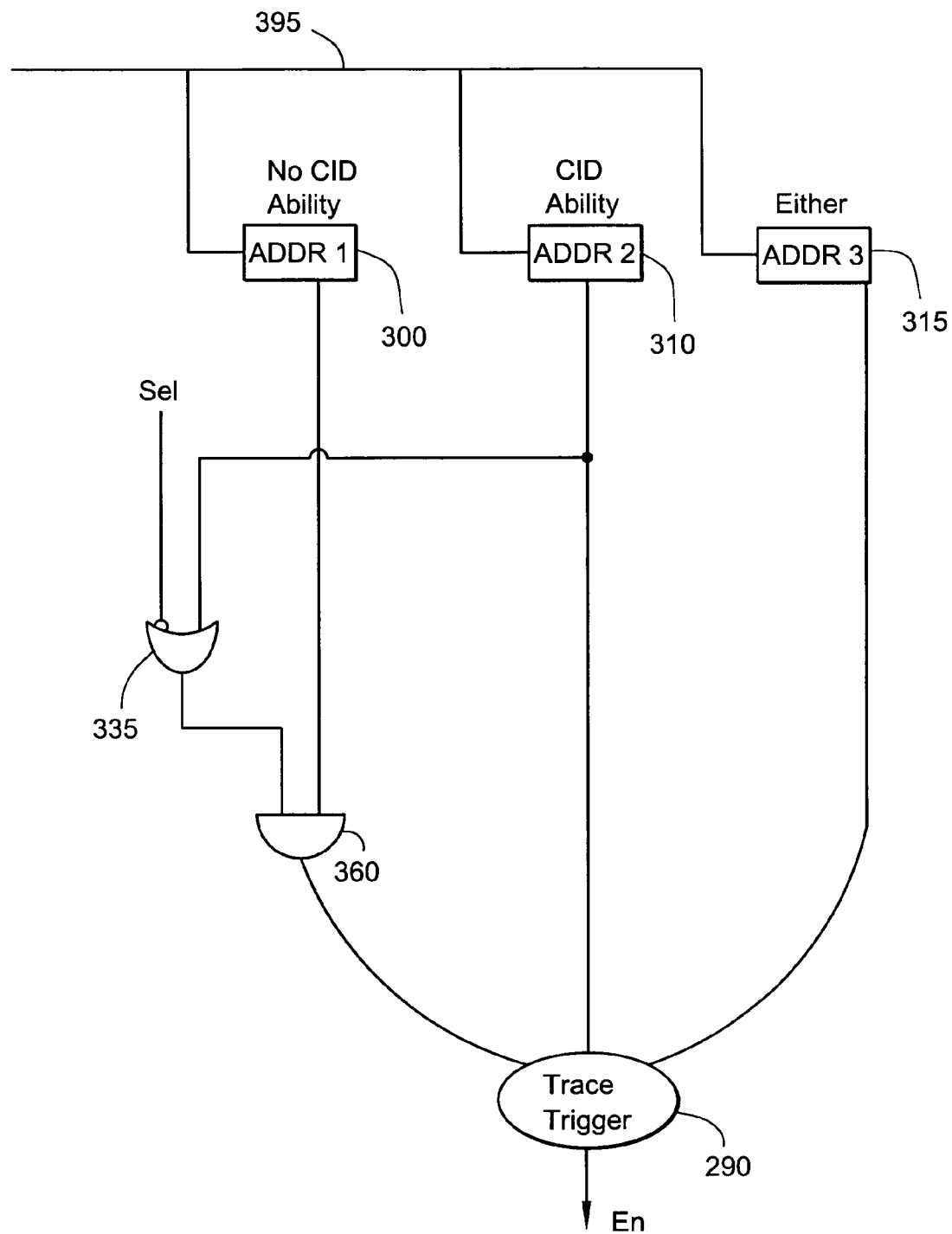
FIG. 6 illustrates an alternative embodiment where an address comparator is used as a context identifier comparator.

FIG. 6 illustrates an alternative embodiment to the FIG. 5 arrangement, where a fixed association is provided between the address comparators. More particularly, in this example, the output from address comparator 300 can optionally be conditioned on the output from address comparator 310 when that address comparator 310 is operating as a CID comparator, but cannot be conditioned on the output of address comparator 315. Indeed, in the example illustrated in FIG. 6, it is irrelevant whether address comparator 315 has CID comparator ability or not.

OR gate 335 is arranged to receive the output from address comparator 310, and an inverted select signal. When the select signal is at a logic zero value (i.e. it is determined that the output from address comparator 300 should not be conditioned on the output from address comparator 310, then a logic one value will always be output from OR gate 335, irrespective of the other input, and accordingly the output from AND gate 360 will always replicate the output from address comparator 300. In the event that the select signal is at a logic one value, indicating that the output from address comparator 300 should be conditioned on the output from address comparator 310 operating as a CID comparator, then it is clear that the output from OR gate 33) will depend on the output from address comparator 310, and accordingly a match signal will only be generated by AND gate 360 when address comparator 300 detects a match in the address, and address comparator 310 detects a match in the CID. The presence of a match signal output by AND gate 360 will cause the trace trigger 290 to generate the appropriate enable signal.

Figure 7:
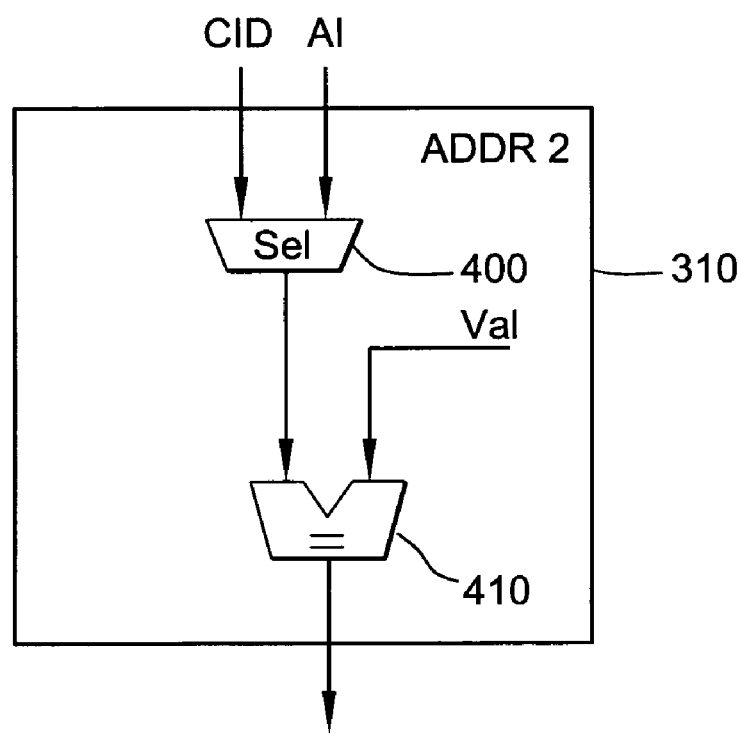
FIG. 7 is a block diagram illustrating the logic provided within an address comparator to enable it to perform context identifier comparison operation in accordance with a preferred embodiment of the present invention.

FIG. 7 is a block diagram illustrating how a basic address comparator might be adapted to enable it to act as an address comparator or a CID comparator. The basic address comparator is shown by comparator 410, which is arranged to receive a pre-stored value, and to compare that with its other input, generating an output signal dependent on the comparison. The other signal is received from a multiplexer 400, which can be arranged to either output an instruction address or CID received as its input, dependent on a select signal received by the multiplexer. The input data to the multiplexer 400 will arrive over path 395, and will be part of the data received by the on-chip trace module indicative of the processing being performed by the core 6. It will be appreciated that the predetermined value input to the comparator 410 will either be an instruction address, or a CID, dependent on whether the address comparator 310 is to operate as an address comparator or a CID comparator. Preferably, that value is re-writable, such that the way in which the address comparator 310 is used can be altered over time.

Whilst the circuits of FIGS. 3 to 7 have been described in a context of a trigger circuit 110 within an on-chip trace module, it will be appreciated by those skilled in the art that the same basic circuitry could be used within the breakpoint circuit of an on-chip debug mechanism used to generate a breakpoint signal to halt execution of the sequence of processing instructions when a predetermined event occurs. In particular, it is envisaged that the embodiments of FIGS. 5 and 6 could readily be used within such a hardware breakpoint unit to issue a breakpoint signal when a predetermined address is detected with the core operating in a predetermined state of operation as indicated by the CID.

The arrangements of FIGS. 5 and 6 also allow a breakpoint signal to be generated purely on the basis of a CID comparison, i.e. without any further qualification by an address. For example, with reference to FIG. 6, the address comparator 310 could be used as a CID comparator, and a match signal generated by that address comparator 310 in such a mode of operation would be provided directly to the triggering circuit 290, in this scenario a breakpoint trigger rather than a trace trigger. The breakpoint trigger could then be arranged to generate the breakpoint signal.

There are a number of ways in which breakpoint signals may be used. In one embodiment, the breakpoint signal may be used to invoke an alternative sequence of data processing instructions, namely a software exception handler, also referred to herein as a breakpoint handler. Such software would typically execute in a privileged mode of operation on the processor core. However, it will be appreciated that if the address comparator 310 were arranged to generate a match signal when a particular CID is detected, and this were used to issue a breakpoint signal to invoke the software exception handler, then in such a scenario an infinite loop of branches to the software exception handler could occur each time the software exception handler starts to execute, as the breakpoint unit would continue to generate a match signal based purely on the match of the CID (i.e, the particular CID is still present and hence will continue to cause a match). This problem is illustrated in FIG. 8A.

Figure 8A:
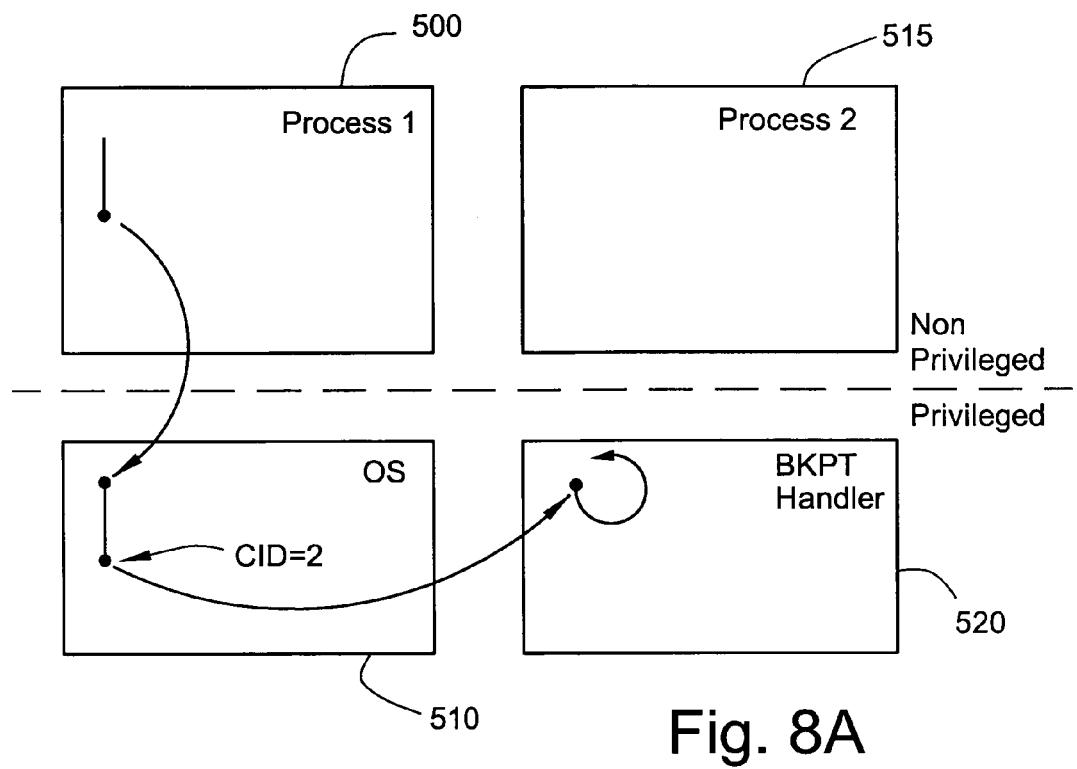
FIG. 8A illustrates an instruction flow sequence that may give rise to a problem when context identifier comparators are used in isolation to trigger a breakpoint in a debug mechanism.

Hence, as can be seen from FIG. 8A, two processes 1 and 2 are illustrated, which have corresponding CIDs of 1 and 2, respectively. It may be desired to generate a breakpoint signal when the processor starts executing process 2. As shown in FIG. 8A, it is assumed that instructions are currently executing in process one 500 executing in a non-privileged mode, and then at some point the processor plans to switch to process 2. At this point, the code will typically jump to some operating system code 510 to be executed in privileged mode in order to set up the switch to process 2. As part of this process executing in privileged mode, the CID will be changed to 2 to indicate process 2, as illustrated in FIG. 8A. At this point, address comparator 310 would match the CID, and would accordingly issue a breakpoint signal which would cause a breakpoint handler 520 to be executed in privileged mode. However, at this point, an infinite loop would arise, since the address comparator 310 would continue to issue match signals each time the breakpoint handler tried to execute, since the CID would still be set to 2.

Figure 8B:
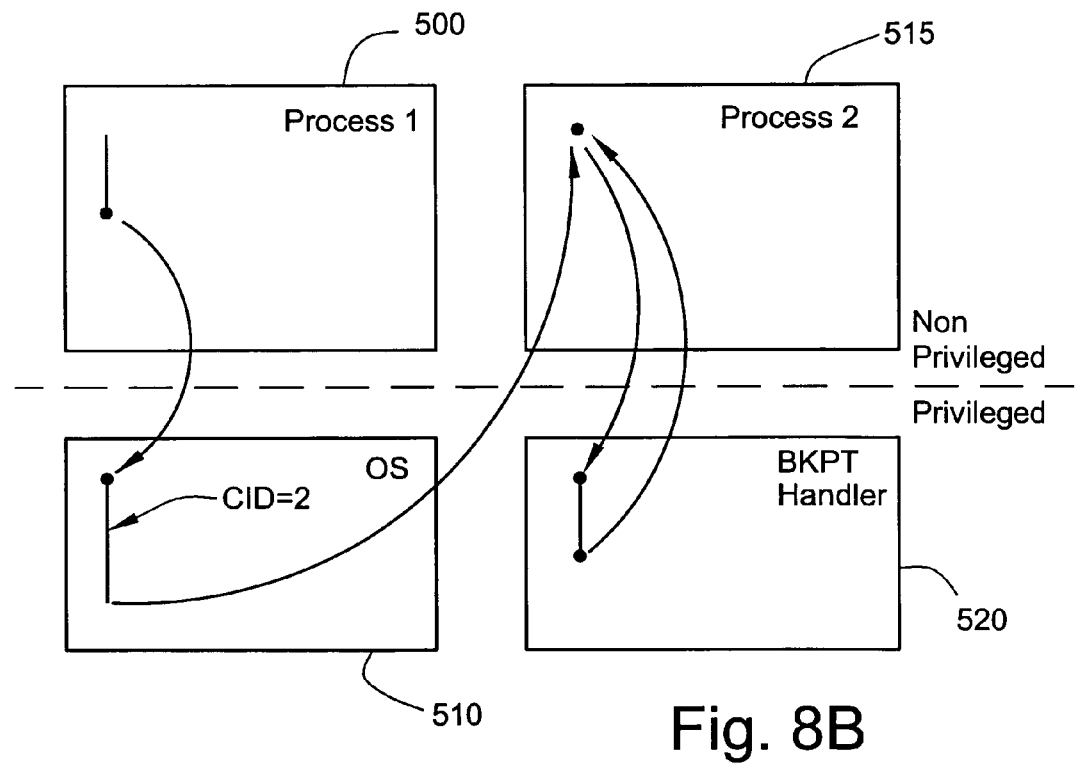
FIG. 8B schematically illustrates an instruction flow of one embodiment of the preferred embodiment, whereby the problem illustrated in FIG. 8A is overcome.
Figure 9:
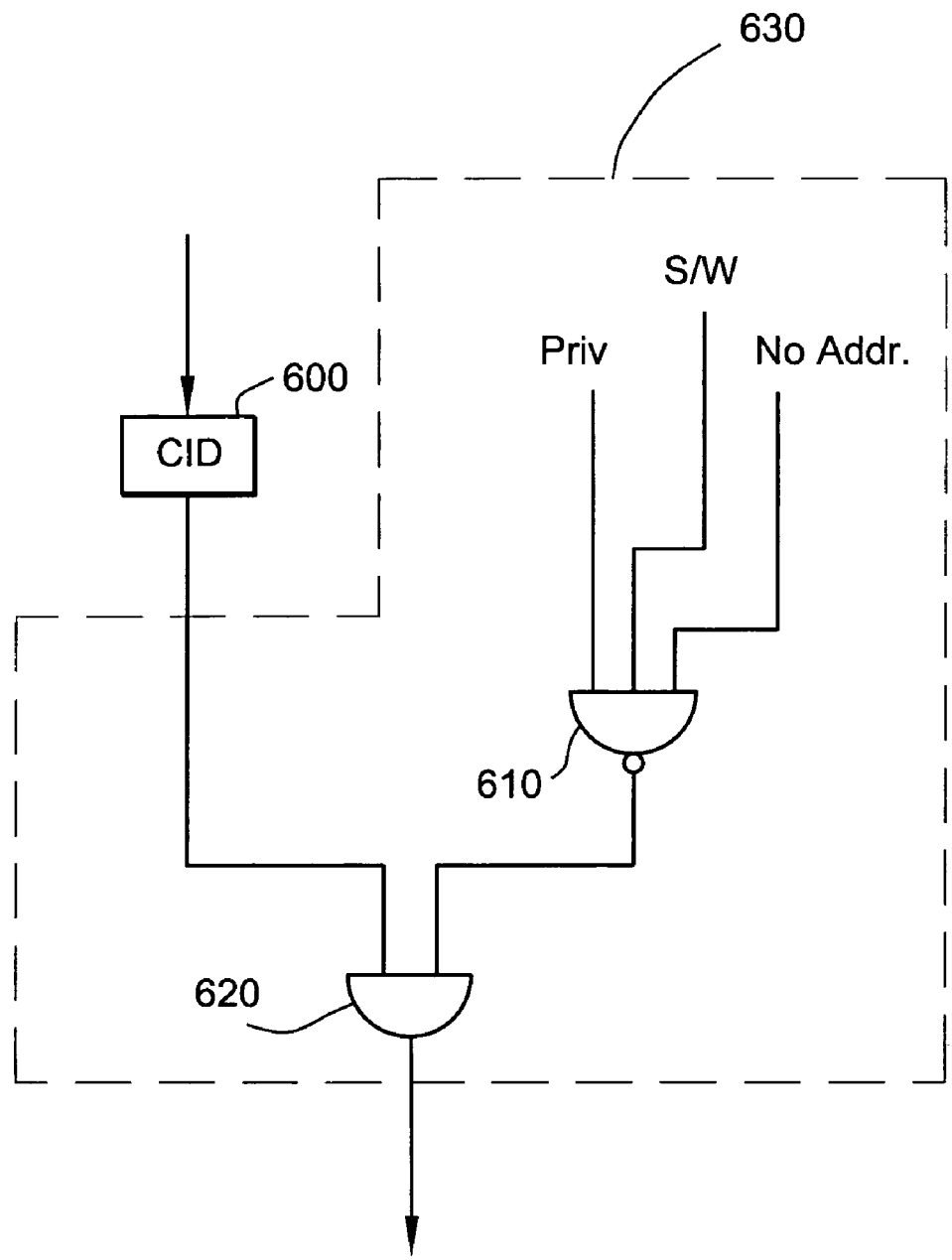
FIG. 9 is a block diagram illustrating additional logic provided in association with a context identifier comparator to avoid the problem illustrated in FIG. 8A arising.

This problem can be avoided by employing the additional circuitry 630 illustrated in FIG. 9 in association with any CID comparator 600 which may generate match signals directly, i.e. without any further qualification by address. Accordingly, the output from the CID comparator 600 is input to an AND gate 620 which receives as its other input the output of NAND gate 610. This NAND gate 610 is arranged to receive three signals, which indicate whether the processor core is operating in privileged mode, whether software debug is enabled, and identify when no further address comparison is being used to qualify the output of CID comparator 600. As long as one of the three signals is not activated, NAND gate 610 will output a logic one value, which will enable the match signal generated by the CID comparator 600 to be output directly as a match signal. However, if all three signals are at a logic one level, i.e, the processor core is operating in privileged mode, software debug is enabled, and no further address comparison is being used, then NAND gate 610 will output a logic zero value, which will prevent the output from CID comparator 600 from being issued until such time as one of the three inputs to the NAND gate is de-asserted. The manner in which this circuitry assists in avoiding the problem illustrated in FIG. 8A can be seen when considering FIG. 8B.

As illustrated in FIG. 8B, when the code of process one 500 jumps to operating system code 510 to facilitate the switch to process two 515, the operating system code will execute, and even when the CID is changed to 2 and CID comparator 600 hence generates a match based on the CID, no breakpoint signal will be issued. Instead, the operating system code will continue to execute the remaining steps to enable the switch to process to 515, after which the processor will begin executing process two 515 in non-privileged mode. At this point, the input signal to NAND gate 610 indicating that the processor core is in privileged mode will be de-asserted, thereby causing a logic one signal to be output from NAND gate 610, and enabling the match signal generated by the CID comparator 600 to be issued, thereby generating the breakpoint signal. This will accordingly cause the breakpoint handler 520 to be invoked. Since this executes in privileged mode, the output from NAND gate 610 will again return to a logic zero level, suppressing any further output from AND gate 620 based on the output of CID comparator 600. Accordingly, the breakpoint handler 520 can execute as required, and once completed, will return execution to the relevant point in process two 515.

A further description of the tracing techniques of at least preferred embodiments of the invention are given in the following architectural description, which should be read in conjunction with the Embedded Trace Macrocell (REV1) description publicly available from ARM Limited, Cambridge, England:

1.1

This document uses the following terms and abbreviations.

| Term | Meaning |
| --- | --- |
| Current protocol | ETM protocol used for ETM7 and ETM9 |
| New protocol | Protocol for ETM10 |

-continued

| Term | Meaning |
| --- | --- |
| ETM packet | Several bytes of related data placed into the ETM FIFO in a single cycle. Up to 3 packets can be placed into the ETM10 FIFO in one cycle |
| Packet header | The first byte of an ETM packet that specifies the packet type and how to interpret the following bytes in the packet |
| CONTEXT ID | A 32 bit value accessed through CP15 register 13 that is used to identify and differentiate between different code streams. This value was previously referred to as the Process ID in ETM7 and ETM9 documentation. The name has changed to avoid confusion with the 7 bit FCSE PID register, which is also located in CP15 register 13 and has also been referred to as Process ID. |
| Trace Capture Device | Any device capable of capturing the trace produced by the ETM: a TPA, a logic analyser, or an on-chip trace buffer |
| LSM | Load or Store Multiple Instruction LDM, STM, LDC or STC instruction |
| Exceptions | Instructions that interrupted by an IRQ, FIQ, PABORT, or reset assertion |

Scope

This document is intended to specify the functionality of the ETM10. ETM10 is a real time trace module capable of instruction and data tracing. Functionality is similar to that of previous ETM implementations for the ARM7 and the ARM9. It is assumed that the reader is familiar with the original ETM specification which is outlined in the Embedded Trace Macrocell Specification (ARM IHI 0014D). This specification is not intended to restate the common architectural features between ETM10 and previous ETM versions, but rather to discuss the portions of the ETM specification that change for ETM10 Most of these changes involve the creation of a new ETM protocol that is capable of properly tracing ARM1020E. This protocol is intended to be extensible for tracing future ARM cores as well.

INTRODUCTION

The Embedded Trace Macrocell is an integral part of ARM's Real Time Debug solution which includes the ETM, a trace port analyser, and a software debugger (such as ADW).

An Embedded Trace Macrocell consists of two parts, a trace block and a trigger block. The trace block is responsible for creating the compressed trace and outputting it across the narrow trace port. The trigger block contains programmable resources that allow the user to specify a trigger condition. The trigger block resources are also used as a filter to control which instructions and which data transfers are traced. All ETM configuration registers (including the trigger block resources) are programmed through the JTAG interface. The user accesses these registers using a software debugger. Once the trace has been captured, the debugger is also responsible for decompressing the trace and providing with user with a full disassembly of the code that was executed. Since the debugger software would not be capable of processing the ETM trace port output in real time, the trace is initially captured into an external Trace Port Analyser (TPA). The TPA may be a fully functional logic analyser, or an ETM specific device such as the Agilent nTrace box. The debugger extracts the trace information from the TPA once the trigger condition has occurred and the debug run has completed. At this high level of description, ETM10 is functionally identical to ETM7 and ETM9.

Changes Required for Etm10

From a user's view, ETM10 will provide equivalent instruction and data tracing capability to that provided by ETM7 and ETM9 with just a few minor differences. This section describes the changes that are being made to the ETM architecture for ETM10 and why they are being made. Many changes affect only the decompression software and are invisible to the rest of the trace tool kit software as well as the end user. However, some changes do affect the programmer's model or result in minor differences in tracing behaviour from ETM7 and ETM9 Such changes are noted in this section. Any changes for ETM10 that require in-depth explanations of the new protocol are covered more thoroughly in the protocol description given in section 5.

1.2 Branch Phantom Tracing

ARM10 implements "branch folding" which means a branch can be predicted, pulled out of the normal instruction stream, and effectively executed in parallel with the next instruction in the program. These folded branches are referred to as branch phantoms. The PIPESTAT encodings in the old protocol only account for one instruction executed per cycle. To allow branch phantoms to be traced, new encodings will be added to the PIPESTAT field that represent a folded branch in parallel with an instruction. The new PIPESTAT values are given in the ETM10 protocol specification in section 5.

Folded branches require changes to the trigger block as well. When a branch is folded, effectively two instructions are executed in parallel. Since the PC value for these two instructions is not guaranteed to have any identifiable relationship, two address comparisons must be made each cycle. This implies that each address register will require two comparators. Both comparator outputs will be taken into consideration when determining whether or not tracing is enabled. (If either of these two instructions should be traced, then tracing will be enabled that cycle.) Special care has been taken to insure that, at most, one extra instruction is traced due to branch folding. In general, the user does not need to be aware when a branch has been folded and executed in parallel with the next instruction to properly program TraceEnable or ViewData.

For events, parallel execution of instructions makes it possible to have slightly different behaviour from ETM10 versus ETM7/9. It is not felt that there is much loss of functionality here due to the way events are typically used. Counters can only count down once per cycle, but counting has only ever provided an accurate count of accesses when single address comparators are used. Furthermore, there is no loss of functionality to the Trigger, TraceEnable, ViewData or ExtOut events: here the event will be active if either instruction or data transfer would have individually caused it to be active, which is the desired behaviour. If the sequencer receives multiple transition requests in the same cycle, no transitions will take place and the sequencer remains in the original state. This behaviour is identical to that of ETM7 and ETM9 However, ETM10 may have more occurrences of multiple transition requests in a cycle since ARM10 supports more parallel execution. The user will need to be aware of this behaviour when programming the sequencer, but there is a work around for simple events. If the desired behaviour is to transition from state 1→2 based on event A and from state 2→3 based on event B, program 1→2 to occur on event (A & B), 2→3 on event B, and 1→3 on event (A & B) Programming the sequencer in this way insures the proper handling of simultaneous occurrence of event A and event B.

1.3 Load Miss and Exception Tracing

ARM10 has a non-blocking data cache that allows other instructions, including other memory instructions, to execute underneath a single outstanding miss; thereby allowing the data cache to return data to the core out-of-order. This feature is an issue for tracking load data since the current protocol expects load data to be placed in the FIFO in-order. Data packets are now prefixed by a header byte in part to accommodate out-of-order load miss data. Header bytes are described in detail in section 5.

Supporting a non-blocking cache also requires changes to data comparators. Like ETM7 and ETM9, ETM10 has data comparators which are used in conjunction with a pair of address comparators. When used, the comparator will only trigger a match when the data matches as well. Since other memory accesses can occur underneath a miss, a bit is added to each comparator to remember whether or not the address for a load request that resulted in a miss matched. When the load miss data is returned, the data value comparison is done, and the saved address match bit is used to qualify the results of the comparison. This match bit is then cleared. In some cases, the user may not wish to wait for miss data to be returned to enable the comparator. Instead, they may want load misses to always be traced based on the data address only. To support both usage models, a bit has been added to the address access type register to allow the user to specify which mode is enabled for each comparator. The user should set bit 8, the Exact Match bit, of the address access type register if waiting for load miss data on a comparison is desired. (Refer to reference 1 for more information on the access type registers.) Waiting for the data compare to occur is useful when data values are used to create triggers and other events. Tracing load misses based on the address alone is useful when the comparator is used for trace filtering and some extraneous tracing is not considered to be a problem. The user should be aware that using data values to create an event, such as a sequencer transition, could result in out-of-order events occurring since the load data may be returned out-of-order. If the user has concerns that ARM10's non-blocking cache may affect programmed events, this feature may be disabled in the core through writes to the cp 15 configuration register (r1). Refer to the ARM1020E TRM (reference 3) for more information.

Bit 7 of the access type register is also used to specify comparator behaviour when an abort, interrupt, or soft reset occurs. These conditions are generically referred to as exceptions If a data access is aborted and bit 7 is asserted, the comparator will NOT result in a match output, regardless of whether or not a data match is requested. If the comparator is tied to an instruction address, then the exact match bit is used to prevent matches on instructions, which are marked as exceptions This behaviour is often desired when a comparator is meant to fire just once since instructions and data requests that result in exceptions are usually reattempted once the aborting or interrupting condition has been resolved In the data access case, when bit 7 is not asserted, an aborted access will result in a match based purely on the address since the data value is assumed to be invalid.

The same Exact Match bit is used for determining proper handling of load misses and data aborts since the desired behaviour would typically be the same for both cases. The default value for the Exact Match bit is zero.

1.4 ARM10 Data Tracing

ARM1020E has a 64 bit data bus capable of returning 64 bits of data in a single cycle. To support this 64 bit data bus, ETM10 must be capable of tracing two adjacent data values in a single cycle. To support tracing just one value or the other, two ViewData outputs are now generated. However, there is still just one output for events and one output for TraceEnable. Having one event output can affect the counter and sequencer logic since two adjacent 32 bit requests that are accessed in the same cycle will only result in one decrement of the counter or only one state change by the sequencer. This should be taken into account by the user when programming event logic, but it is not expected to be a significant problem.

1.5 LSM Tracing

The ARM1020E has an independent load/store unit, which allows other instructions to execute underneath a load or store multiple instruction, hereafter referred to as an LSM, while the load/store unit iterates through the data accesses. (i.e. executing an LSM does not stall the core). To support this, some changes are required to the address comparator output and to the assertion of TraceEnable:

- Whenever tracing it active while iterating on an LSM instruction, it will remain active until the LSM completes, regardless of whether or not TraceEnable remains asserted. (The only exception to this rule would be the overflow case.) This rule has the side effect of causing other instructions executed underneath the LSM to be traced regardless of whether or not they otherwise would have been. However, it will not result in any extra data packets since instructions running underneath the LSM by definition cannot be data instructions.
- Whenever a comparator is activated on the instruction address of an LSM, the ViewData output of that comparator will remain asserted until the entire instruction completes This is done since the intention of the user is to trace all data packets associated with this instruction. In a similar fashion, ViewData and Event range outputs will remain asserted until the completion of the LSM instruction. Event single address comparator outputs do not remain asserted since by definition these outputs should assert for just a single cycle
- Once a data transfer associated with an LSM has been traced, subsequent transfers associated with that instruction that would not normally be traced will have a place holder packet output (Value Not Traced—see section 5) These place holder packets are required to determine which words were traced.

The ETM protocol allows for instruction tracing to be enabled based on load/store data addresses (and data values). Since on ARM10, the LSM instruction may no longer be in the core's execute stage when the tracing enabling event occurs, this instruction address will need to be kept around and broadcast in a special way to support this feature. This is accomplished using the LSM in Progress TFO packet. Trace Packet Offsets are described in section 5.2.4.

1.6 Auxiliary Data Tracing

The addition of data headers to the protocol also allows for the tracing of auxiliary data types (i.e, the tracing of data values other than those for load, store, and CPRT instructions). This auxiliary data type tracing is meant to allow for expansion of ETM tracing, which may include the tracing of external ASIC data in future versions of the ETM. More information is given on auxiliary data tracing in the data headers discussion in section 5.

1.7 CONTEXT ID Tracing

CONTEXT ID values need to be broadcast whenever they are updated and whenever a TFO packet is required for synchronisation. For ETM10, CONTEXT ID values are output when they are updated by simply enabling data tracing for the CPRT instruction that resulted in a CONTEXT ID change. A unique data header for this data packet allows the decompressor to recognise that the data is a new CONTEXT ID value (data headers are discussed in section 5). The ETM also broadcasts the current Context ID value whenever trace is enabled, and during trace synchronisation cycles which are described in section 5.2.4.The CONTEXT ID update instruction is MCR c15, 0, rd, c13, c0, 1.

Rather than requiring another 32 bit port on the ARM10 ⇆ETM10 interface, ETM10 recognizes Context ID updates and maintains the current Context ID value in an internal shadow register. To properly maintain coherency, this register will always be updated, even when the ETM is in POWERDOWN mode. (ETM register 0X4, bit 0 is asserted).

Using CONTEXT ID values for trace filtering is being added as an additional feature for ETM10. This will be implemented via a new set of programmable registers in the ETM in which an expected CONTEXT ID value can be specified:

| Register encoding | Description |
| --- | --- |
| 110 1100 | CONTEXT ID value 1 |
| 110 1101 | CONTEXT ID value 2 |
| 110 1110 | CONTEXT ID value 3 |
| 110 1111 | CONTEXT ID mask value |

The same mask is used for each CONTEXT ID comparator, and works in the same way as data comparator masks.

Bits 9:8 of the address comparator access type registers will indicate whether CONTEXT ID comparators are used. A value of 00 causes the CONTEXT ID comparators to be ignored. A value of 01, 10 or 11 causes the address comparator to match only if the current CONTEXT ID matches that in CONTEXT ID comparator 1, 2 or 3 respectively, after taking account of the CONTEXT ID mask.

New event resources will be allocated to allow the CONTEXT ID comparators to be accessed directly from within the event block (see section 3.3 4 of ARM IHI 0014D). These new resources will be mapped to 0×58-0×5A:

| Bit encoding | Range | Description |
| --- | --- | --- |
| 101 | 0x8 to 0xA | CONTEXT ID comparator matches |

A new field will be added to the ETM configuration code register to indicate the number of CONTEXT ID comparators present (see section 4.2.2 of ARM IHI 0014D):

| Bit numbers | Valid Range | Description |
| --- | --- | --- |
| 25 24 | 0 to 3 | Number of CONTEXT ID comparators |

1.8 Trace Output Frequency

The ARM1020E Macrocell will be capable running at core frequencies beyond 300 MHz. Previous ETM implementations have not pushed frequencies beyond 200 MHz. The maximum output frequency attainable for an ETM trace output is dependent upon the maximum sample frequency of the trace analyser and the maximum output frequency attainable at the pads. Agilent and Tektronix analysers can capture at a maximum frequency of 333 MHz and 400 MHz, respectively. However, it is highly unlikely that any CMOS pads available from ARM partners will be capable of providing clean, traceable signals at this frequency. Therefore, the pads are expected to be the speed-limiting factor. Some speed improvements can be obtained by using larger pads and/or using board level buffering. These techniques may allow us to trace reliably at 200 MHz. For tracing at higher speeds, there are two options. We can double the pin count and halve the frequency (a demultiplexed trace port), or we can utilise an on-chip trace buffer. Both techniques have positive and negative points.

Doubling the pin count is not an attractive option to some partners due to package limitations and the high cost of additional pins. This technique will also require changes to the TPA, and, most likely, the addition of a second mictor connector which takes up more board area and adds more cost. Furthermore, this technique still has a speed limitation of 400 MHz. An ARM10 processor fabricated in a hot process will most likely exceed these speeds.

The on-chip buffer has the advantages of tracing reliably at the core clock speed and of not requiring any extra pins. In fact, if all trace capturing will be done utilising the on-chip buffer, then the externally visible ETM port can be eliminated since the on-chip buffer would be downloaded via Multi-ICE through the JTAG port. The disadvantage of this solution is that the size of the on-chip buffer is typically quite small, on the order of 8–16 KB. Therefore, tracing depth is limited. Larger on-chip trace buffers are possible, but directly impact the size of the ASIC, and even a small trace buffer may use more silicon space than can be afforded in some designs.

Due to the varying advantages and disadvantages of each method, both of the options listed above are planned to be supported. The ARM10200 rev 1 test chip will be built with a demultiplexed trace port for high-speed tracing. An on-chip trace buffer will not be part of the ARM10200 rev 1 test chip.

A specification for an on-chip trace buffer for ETM9 has been written, and an implementation is in progress. It would be possible to create an ETM10 compatible on-chip trace buffer from this design with Just a minor change to support the new 4 bit PIPESTAT encodings that are described in detail in section 5.2. Refer to reference 4 for more information on what Trace Capture Device changes are required to support ETM10. Depending on timescales, an ETM10 compatible on-chip trace buffer may offer additional features, such as dynamic trace compression, and it may in fact be integrated directly into ETM10 design as a FIFO replacement.

1.9 Synchronisation Register

In previous ETM implementations, synchronisation occurred via a five-byte instruction address every 1024 cycles, and a five-byte data address every 1024 cycles. For ETM10, these synchronisation points will be configurable via a new 12 bit programmable register. Configurable synchronisation makes it easier to utilise a full range of trace buffer sizes. Small trace buffers, such as the on-chip trace buffer, can synchronise frequently to avoid throwing away large portions of the trace, while larger trace buffers can synchronise infrequently to avoid wasting trace throughput on unneeded synchronisation. The default counter value will be 1024 cycles. To prevent data address and instruction address synchronisation from occurring concurrently, data address synchronisation will occur when the counter reaches its midpoint value and instruction address synchronisation will occur when the counter reaches zero. The address for the new synchronisation register is 0×78.

1.10 Memory Map Decoder

The external memory map resource inputs that were present in previous ETM implementations are not being supported for ETM10. The extra complexities present in the ARM10 architecture make support for an external decoder more difficult to implement. External events can still control tracing by utilising the EXTIN inputs, which are now cycle accurate (discussed in section 4.15).

1.11 Rangeout

Previous ETM implementations have been able to use data value compare registers inside the Embedded ICE logic as extra trigger resources. This functionality was accomplished by using the RANGEOUT outputs coming from the Embedded-ICE. The ARM10 debug unit does not have these RANGEOUT outputs since it does not have any data value compare functionality. Therefore, this resource reuse is not possible for ETM10. This has a minor impact on the programmer's model since these resources can no longer be programmed.

1.12 Branches to Interrupt Vectors

The current protocol specifies that direct branches to entries in the interrupt vector table must be traced as indirect branches. This is no longer always possible as phantom branches cannot be converted into indirect branches within the proposed protocol. Therefore for consistency and simplicity direct branches to interrupt vectors will no longer be traced as indirect branches, regardless of whether or not the direct branch was a branch phantom. It is possible to detect branches to the PABORT, FIQ, IRQ, DABORT, and RESET vectors due to a special encoding in address byte 5 that IS described in 5.3.1

1.13 Protocol Version

The 4-bit ETM protocol version field present in the configuration code register (register 0×01) on ETM7 and ETM9 has been determined to be insufficient to support future protocol versions for the ETM. Therefore, a new ETM ID register has been defined that contains fields specifying the ARM core for which it is intended as well as minor and major protocol revision numbers. This register is mapped to register address 0×79 and is considered valid whenever bit 31 in the configuration register is set. This allows ETM7 and ETM9 to still use protocol variants 0–7 without requiring the ID register. The ETM ID register will contain a 32 bit value broken up into the following fields:

| Bit numbers | Description | Examples |
|---|---|---|
| [3:0] | Minor protocol number | ETM 7/9 rev 0 = 0 |
| | | ETM 9 rev 0a = 1 |
| | | ETM 7/9 rev 1 = 2 |
| [7:4] | Reserved | N/A |
| [11:8] | Major protocol number | ETM 7/9 = 0 |
| | | ETM 10 = 1 |
| [15.12] | ARM Core | ARM 7 = 0 |
| | | ARM 9 = 1 |
| | | ARM 10 = 2 |
| [16] | Indicates that 32 bit data value comparisons require 2 register updates | ARM 10 = 1 |
| [23:17] | Reserved | ARM 10 = 0x00 |
| [31:24] | ASCII character 'A' | ARM 10 = 0x41 |

ETM10 rev0 will have the ID value 0x41012100.

1.14 Trace Start/Stop Resource

A new event resource will be included to give the current state of the TraceEnable start/stop logic. This shall be given resource number 101 1111 (see section 3.3.4 of ARM IHI 0014D), and shall be asserted whenever the Trace Start/Stop block is active. ETM versions that support the start/stop resource will also assert bit 23 in the ETM control register.

1.15 TPA Changes

All TPAs will need a minor change to support the new trigger and trace disable status values for ARM10. Namely, they must ensure that PIPESTAT[3]/TRACESYNC is LOW in order to detect TR and TD PIPESTATs. For logic analysers this is simply a minor software change. The Agilent nTrace will require minor hardware changes as well. To support high speed tracing through a demultiplexed, half speed ETM port, the TPA will need to be capable of capturing two core cycles worth of trace data in each cycle. This data will be broadcast across two Mictor connectors. Therefore, support for multiple connectors is required as well. For more information on these changes, please refer to reference 4.

1.16 Precise Events

In ETM7 and ETM9, events generated via the Event block were imprecise, which means the user was not guaranteed to trace the data access or the instruction that generated the Event. For ETM10 this is no longer the case. Assertion of ViewData and TraceEnable is always precise regardless of how it is generated.

1.17 FIFOFULL Level Register

For ETM7 and ETM9 register 0x0B was used to set the level at which the FIFO must reach before FIFOFULL would be asserted. For ETM10, FIFOFULL this register is not used and instead FIFOFULL, when enabled, is asserted whenever new packets are to be placed in the FIFOFULL. ETM10 is more deeply pipelined than ETM7/9, and FIFOFULL can only be asserted early enough to be useful if it is used in this way. In ETM10, the FIFOFULL register is reused as a read-only register that specifies the FIFO size. FIFO size is something that could not be determined by software in ETM7/9.

1.18 TRIGGER Output

If the processor is in monitor debug mode, DBGRQ will be ignored. Therefore, it is useful to have some other mechanism to allow the core to recognize that a trigger has occurred. For this purpose, a single bit TRIGGER output has been added to the ETM interface for ETM10. The TRIGGER output is asserted whenever the four-bit TRIGGER status is driven on the PIPESTAT bus. This signal can then be used by an interrupt controller to notify the core of the trigger via the assertion of an interrupt. The TRIGGER output can be left unattached if it is not needed.

1.19 Counter Event

For ETM7/9, the counter event registers had an extra bit 17 which could be used to count continuously. This bit has been removed since its behaviour is redundant and hard to verify. If the user wants a continuous counter, simply program the event equal to external resource 15, which is hardwire to be always active.

ETM10 Trace Port

1.20 ETM10 Port Signals

The ETM10 trace port consists of two signals, PIPESTAT and TRACEPKT, which are both valid on the rising edge of TRACECLK (which has the same frequency as GCLK.) PIPESTAT has been expanded for ETM10 from a 3 bit to a 4-bit signal to add encoding space for branch phantoms. TRACEPKT has not changed from the previous ETM versions, it can be 4, 8, or 16 bits depending on the configuration The TRACESYNC pin has been removed from the protocol since synchronization is now achieved via another mechanism. The overall result is a trace port with the same pin count as previous ETM implementations.

1.21 PIPESTAT Encodings

| Encoding | Mnemonic | Description |
|---|---|---|
| 0000 | IE | Instruction executed |
| 0001 | DE | Instruction executed, packet(s) have been placed on the FIFO |
| 0010 | IN | Instruction not executed |
| 0011 | DN | Instruction not executed, packet(s) have been placed on the FIFO |
| 0100 | WT | Wait: No instruction this cycle, valid data is on the trace port |
| 0101 | DW | Wait + data: No instruction this cycle, packet(s) have been placed on the FIFO |
| 0110 | TR | Trigger: Trigger condition has occurred, real PIPESTAT value is on TRACEPKT[3:0] |
| 0111 | TD | Trace disabled: no data on trace port |
| 1000 | PT_IE | Branch phantom taken + IE |
| 1001 | PT_DE | Branch phantom taken + DE |
| 1010 | PT_IN | Branch phantom taken + IN |
| 1011 | PT_DN | Branch phantom taken + DN |
| 1100 | PN_IE | Branch phantom not taken + IE |
| 1101 | PN_DE | Branch phantom not taken + DE |
| 1110 | PN_IN | Branch phantom not taken + IN |
| 1111 | PN_DN | Branch phantom not taken + DN |

1.21.1 Branch Phantom PIPESTATs

The eight new branch phantom encodings are added to account for branch phantoms that are executed in parallel with the following instruction. These encodings should always be interpreted as the branch instruction being first in the execution stream. Only direct branches are predicted, so branch phantoms never place data packets in the FIFO Folded branches that are mispredicted will result in a normal IE/IN PIPESTAT since any instruction that would have been executed in parallel was from the incorrect instruction stream and was therefore canceled.

1.21.2 Data PIPESTATs

All mnemonics starting with 'D' mean that a data packet of some sort has been placed in the FIFO that cycle and will eventually be output on the TRACEPKT pins. Note that the word 'packet' for the new protocol refers to a multiple byte quantity that is placed in the FIFO rather than a single byte in the FIFO. The data packet may be a branch address, a load/store transfer, a CPRT transfer, or an auxiliary data packet. ETM10 is will place up to a maximum of three data packets in the FIFO in one cycle (two LDST/CPRT transfers and one branch address packet.) Note that three packets in one cycle is a limitation of the hardware, not the protocol. The need for separate data and branch PIPESTATs has been removed by the addition of packet header bytes to the protocol. The addition of DW and DN status values allows a data packet to be attached to any arbitrary cycle. This addition means that coprocessor maps for determining the length of LDCs/STCs are no longer necessary, and tracing of variable length LDCISTC instructions is now supported. Packet header bytes will be described in more detail in section 5.3.

1.21.3 Instruction PIPESTATs

Non-wait PIPESTAT values, i.e, those that indicate an instruction was executed, are always given on the first cycle the instruction is executing. This distinction is important for LSM instructions that execute and return data for several cycles. Note that this behavior is different from previous protocol versions, which would give the executed PIPESTAT value on the LAST cycle the LSM was executed.

"Not executed" PIPESTATs (IN/DN) can occur due to two reasons. Either the instruction has failed its condition codes, or it was not executed due to an exception. As mentioned earlier, possible exceptions include interrupts, prefetch aborts, and reset assertion. Load/store instructions that result in data aborts are not given a IN/DN status since they are considered to have executed. The decompressor needs to know when an exception is preventing an instruction from executing. This information is used to prevent late data packets from a previous LSM instruction from being attached to the exception instruction. (The only data packets allowed for an instruction with a 'not executed' PIPESTAT is a branch address

1.21.4 TD Status and TFOs

A status of TD means that trace FIFO data is not present on the TRACEPKT this cycle. There are two reasons why this could occur.

There is no data to be traced in the FIFO (if the FIFO is not empty, the status would be WT) In particular, this will occur shortly after trace is disabled until it is next enabled.

A TFO is being broadcast for ETM synchronization.

When a TD status is given on PIPESTAT, the decompression software will need to look at the TRACEPKT value to determine whether or not a TFO has been broadcast. TRACEPKT[0] is used to differentiate between cycle-accurate, and non-cycle accurate trace as is done in previous ETM implementations. As before, Trace Capture Devices may discard TD cycles where TRACEPKT[0]=0. If TRACEPKT[0] is asserted, TRACEPKT[3:1] is used to specify whether or not a TFO is broadcast. When a TFO is broadcast, TRACEPKT[7:4] specify the lower four bits of the TFO value. TRACEPKT[3:1] specify the remainder of the TFO value as given in the table below. TFOs are encoded in this way to maximize the range of valid TFO values.

| TRACEPKT[3:0] | Description |
|---|---|
| XXXXXXX0 | Trace disabled; non-cycle accurate |
| XXXX0111 | Trace disabled; cycle accurate |
| XXXX1001 | TFO value 0–15 (TRACEPKT[7:4] + 0) |
| XXXX1011 | TFO value 16–31 (TRACEPKT[7:4] + 16) |
| XXXX1101 | TFO value 32–47 (TRACEPKT[7:4] + 32) |
| XXXX1111 | TFO value 48–63 (TRACEPKT[7:4] + 48) |
| XXXX0001 | TFO value 64–79 (TRACEPKT[7:4] + 64) |
| XXXX0011 | TFO value 80–95 (TRACEPKT[7:4] + 80) |
| XXXX0101 | Reserved |

A TFO, or Trace FIFO Offset, is used when decompressing the trace information to synchronize between the pipeline status (PIPESTAT) and the FIFO output (TRACEPKT). TFOs are generated whenever trace is first enabled and whenever the instruction synchronization counter reaches zero. Trace FIFO offsets replace the address packet offset (APO) information that was used in previous ETM implementations. Rather than counting branches, TFOs count the number of bytes that are currently in the FIFO. Synchronizing in this manner removes the need for the TRACESYNC pin in the protocol. It also removes the need for starting tracing with a BE PIPESTAT followed by two dead cycles for APO values Whenever a TFO is broadcast for synchronization while trace is already enabled, a PIPESTAT value of IE is implied. When TFOs are broadcast to initiate tracing, no PIPESTAT is implied and PIPESTAT for the first traced instruction will be given in the following cycle.

TFOs for synchronization are generated whenever all the following criteria are met:

A cycle counter, typically initialized to 1024, reaches zero
The current instruction has a PIPESTAT value of 'IE'

Once a synchronization request has been indicated, the TFO cycle counter is reset to whatever value has been programmed into the instruction synchronization register (default value is 1024) and begins counting again. In the case where a second synchronization request is made before the first has been serviced, the ETM is forced into overflow as a way to force synchronization to occur. Some trace is lost in this scenario, but this is not thought to be an issue since, if this happens, the processor is most likely stuck in an infinite loop. Therefore, no meaningful trace is lost. The only time this may not be the case is if the synchronization counter is set to some ridiculously low number. Therefore, it is ill advisable to set the synchronization value too low (anything below 50 cycles).

When a TFO cycle occurs, several bytes of data are placed on the FIFO that cycle. This data is referred to as a TFO packet and typically consists of a special header byte, the current CONTEXT ID, and a full instruction address. The proper format for TFO packets is given in section 5.4

Note that, in the four-bit TRACEPKT configuration, if a TFO occurs when the second nibble of a byte is expected, an extra nibble of value '0×6' is output on TRACEPKT[3.0] immediately following the TFO value. This nibble is required since TFO values specify synchronization in terms of bytes, not nibbles. By outputting this extra nibble, ETM10 guarantees that current top of the FIFO, pointed to by the TFO value, will always be byte aligned. It is important that the decompressor is aware that this extra nibble will appear on TRACEPKT[3:0] for the case where synchronization is not required. The decompressor should always expect this extra nibble whenever a TFO is generated on an odd nibble regardless of whether the TFO is due to synchronization or Trace being enabled. FIFO output is delayed until the complete TFO value (and extra nibble, if required) has been output on TRACEPKT[3:0].

1.21.5 Trigger Status

A trigger status (TR) implies that the real four-bit status for this cycle is placed on TRACEPKT[3:0] and FIFO output is delayed by one cycle. This behavior is identical to ETM7 and EMT9. If a trigger and a TFO want to occur at the same time, the PIPESTAT value on TRACEPKT[3:0] will be TD. This is uniquely identifiable as a true TFO since WT pipestats will never be converted to TD pipestats when a trigger occurs. In the four bit port case, if a trigger wants to occur in the second cycle of a TFO broadcast (or the gap cycle), the trigger will occur and the FIFO output will be delayed by an extra cycle to output the remaining TFO nibble(s). Therefore, triggers are never delayed and are guaranteed to be output immediately when generated.

1.22 Packet Header Encodings

Packets are placed in the FIFO due to a PIPESTAT value with the 'D' encoding Up to three packets (two data packets and one branch address packet) can be placed in the FIFO in a single cycle. Here are the encodings for packet header values:

| Value | Description |
| --- | --- |
| CXXXXXX1 | Branch address |
| CTT0SS00 | Load Miss data, TT = tag |
| C0AMSS10 | Normal data, A=First data packet (address expected) |
| C1A1TT00 | Load Miss occurred, TT = tag, A=First data packet |
| C1101010 | Value Not Traced |
| C1101110 | Context ID |
| C10MSS10 | Reserved for full-visibility data tracing |
| C111SS10 | Reserved for auxiliary data |
| C1100X10 | Reserved |
| C0x1xx00 | Reserved |

The C bit on a data header is used to inform the decompression tool how many packets are being inserted into the FIFO in a single cycle. The C bit is asserted for each packet inserted up to but not including the last packet. This is necessary for the decompressor to know which packets should be tied to which cycle, and therefore which instruction. This C bit should not be confused with the address continue bit which is indicated by a lower case 'c'.

1.22.1 Branch Address

Branch addresses are encoded in a similar way to previous ETM implementations. A branch packet can still be one to five bytes long, and the decompression tool should expect more bytes whenever the c bit is enabled. However, bit zero of a branch address is no longer used to differentiate between Thumb and ARM state. Instead, all branch addresses are prefixed, pre-compression, with a one in $33^{rd}$ bit position. Once compressed, all branch addresses are suffixed with a one in the $0^{th}$ bit position. The one in bit zero identifies the packet as a branch address, and the one in bit 33 is used to help distinguish between ARM and thumb addresses. Since ARM addresses must be word aligned, only bits [31:2] of an ARM address are broadcast. Thumb addresses are half-word aligned and therefore need only broadcast bits [31:1]). Broadcasting a different number of bits for ARM and Thumb addresses combined with having the $33^{rd}$ bit always asserted pre-compression guarantees that a full five byte address will be broadcast on a transition between ARM and Thumb state.

Furthermore, ARM and Thumb address can always be uniquely identified by the high order bits of the fifth address byte, as shown in the following table:

| ARM 5 byte address | Thumb 5 byte address |
| --- | --- |
| 1XXXXXX1 | 1XXXXXX1 |
| 1XXXXXXX | 1XXXXXXX |
| 1XXXXXXX | 1XXXXXXX |
| 1XXXXXXX | 1XXXXXXX |
| 0E001XXX | 0E01XXXX |

If present, a branch target address will always be the last item to be placed into the FIFO on a given cycle. Therefore, a packet continuation bit (C bit) is not required. Reasons codes are no longer broadcast on address bits 6:4 in the $5^{th}$ byte since they are now given as part of the TFO packet header, which is discussed in section 5.4. Bit 6 of the $5^{th}$ byte is used to indicate an exception branch address (indicated by an 'E' in the table above). This bit is set on any branch due to an abort, interrupt, or soft reset. This is useful so that the decompressor can recognize, and indicate to the user, that these interrupted instructions were not actually executed. Bit 7 and Bit 5 of the fifth address byte remain reserved for future use.

1.22.2 Normal Data

The normal data header is used for all loads that do not miss in the cache and for store data packets. It is also used for CPRT data packets if CPRT data tracing is enabled If data address tracing is enabled, the data address will be broadcast after the header packet and before the data value, if present. Data addresses are broadcast using the same compression technique as instruction branch addresses and therefore consist of one to five bytes. As is true for previous ETM implementations, whether or not data addresses are traced must be statically determined before tracing begins. If two normal data packets are given in a single cycle (due to a 64 bit data transfer) only the first packet will contain a data address. When data for LSM instructions are broadcast, the data address is only broadcast with the first data packet, even though subsequent data packets will be transferred in different cycles. The A bit in the normal data header is used to specify that this is the first data packet for a particular instruction, and therefore a data address should be expected (if address tracing is enabled). Having this information available in the header byte allows the decompressor to maintain synchronisation when tracing through sections of code which are not decompressable (i. e. any region for which a binary is not available) The 'A' bit is not asserted on CPRT packets.

The 'MSS' bits in the normal data encoding are used for data value compression. When the M bit is low, the SS bits specify the size of the data value transferred. Leading zeros are removed from the value as a simple form of data compression. Preliminary experiments show this compression technique yields about 20–30% compression, which is enough to offset the additional bandwidth cost of the header byte. Encodings with the M bit set are reserved for future compression techniques The exact encodings for the MSS bits are given in the following table:

| Encoding | Description |
| --- | --- |
| 000 | Value == 0, no data bytes follow |
| 001 | Value < 256, one data byte follows |
| 010 | Value < 65536, two data bytes follow |
| 011 | No compression done, four data bytes follow |
| 1xx | Reserved for future compression techniques |

1.22.3 Load Miss

The Load Miss Occurred and Load Miss Data header types handle load requests that miss in the data cache. When a load miss occurs, a Load Miss Occurred packet is placed in the FIFO where the data value is expected. If data address tracing is enabled, the packet will include the data address. Otherwise, the packet will consist of just the Load Miss Occurred header byte. When a Load Miss Occurred packet is read, the decompression software will then know that the data value is now an outstanding miss, and it will be returned later. Once the data is returned, the PIPESTAT value for that cycle will be modified to the '+DATA' version and the Load Miss Data packet, consisting of the Load Miss Data header byte and the actual data value, will be placed in the FIFO. The Load Miss Data packet will never include a data address. Since the load/store unit must have a free cycle to return Load Miss data, this data will never be returned in the same cycle as data for another load or store request.

The 'TT' bits in the Load Miss header types are used as a tag to identify each load miss. The Load Miss Occurred packet will always have the same tag value as it's corresponding Load Miss Data packet. ARM1020E only supports one outstanding Load Miss at a time, but a second load miss packet may be broadcast before data for the first miss is returned. Therefore, to uniquely identify all load misses, tag values 2'b00 and 2'b01 are supported on ETM10 rev 0. Two bits have been allocated to the tag field to support future processors that may allow more outstanding misses. Furthermore, although ARM1020E will always return miss data in order (relative to other load misses), this tagging mechanism will support future processors that may return miss data out-of-order.

When a miss occurs on a 64 bit load value, two Load Miss packets are placed in the FIFO in the same cycle The decompressor will know that these two misses are for a single 64 bit value since both packets will have the same tag value and they will be placed in the FIFO in the same cycle. As with normal data packets, the data address will only be present with the first Load Miss packet, and will not be present at all if the miss occurs in the middle of an LSM that has already broadcast data packets. When Load Miss data is returned for the 64 bit case, it is always returned as two separate Load Miss Data packets given in the same cycle Both packets will have the same miss tag.

Load miss data packets use the MSS bits for size information and data compression as is done for normal data. If the decompressor receives an unexpected Load Miss data packet (i.e. a miss data packet is given without a pending miss occurred packet with the same tag), it should skip over the specified number of bytes given in the size. If trace is disabled before the outstanding miss data is returned then this data item will be placed in the FIFO with a 'DW' PIPESTAT as soon as it's available. If trace is enabled with a reason code of overflow or exited debug, the decompressor should cancel any pending Load Miss packets.

1.22.4 Auxiliary and Full-Visibility Data Tracing

The auxiliary and full-visibility data header encodings are reserved slots set aside for expandability in the protocol. It is possible that these packet types will be used for tracing auxiliary data both internal and external to the processor (Full-Visibility refers to tracing all register file updates). Like other data packets, auxiliary data packets utilise the SS bits for size information. Full-Visibility data tracing supports the M bit for further compression as well. These packet types will not be used on ETM10 rev 0.

1.22.5 Context ID

The Context ID header byte is only used when the Context ID is modified via the Context ID update instruction: MCR c15, 0, rd, c13, c0, 1. The size of the data value is statically determined by the Context ID size specified in the ETM10 control register (register 0x0, bits [15:14]) Only the number of bytes specified will be traced even if the new value is larger than the number of bytes specified. If the size is specified as zero, then Context ID updates will not be traced Note that even though the Context ID update instruction is an MCR, Context ID value tracing is completely independent from tracing data values from other CPRT instructions. It is not affected by the Monitor CPRT bit in the ETM10 control register (register 0x0, bit [1]). Using a unique header value for Context ID updates allows the decompressor to recognize Context ID changes even when tracing through code regions which are not decompressable (i.e. any region for which a binary is not available).

1.22.6 Value Not Traced

Previous ETM implementations have only been able to trace either all or none of the data values for an LSM operation, and this decision has been made at the time of the first transfer Since today's compilers will often combine adjacent LDR/STR operations into an LSM unbeknownst to the user, this behaviour is undesirable. With the addition of Value Not Traced packets, we have added the ability to partially trace an LSM and only output the data values that exactly match the trigger criteria.

Whenever the first data value associated with an LSM is traced, a normal data packet is placed in the FIFO containing the data address (if address tracing is enabled) and the data value (if data value tracing is enabled). All subsequent data transfers for this LSM will result in a packet being placed in the FIFO. If subsequent values are traced, then a normal data packet, giving the data value only, will be traced. If subsequent data transfers should not be traced, then Value Not Traced packets will be placed on the FIFO for these transfers. Value Not Traced packets consist of only the Value Not Traced header byte. The decompression software can then use the Value Not Traced packets in combination with the normal data packets to determine which LSM values were traced and which were not by working backwards from the final data transfer. Note that, as stated earlier, once tracing begins on a LSM instruction, it will continue until the LSM completes, even if TraceEnable is deasserted before the instruction completes.

1.22.7 Reserved

There are a total of ten reserved slots remaining in the data header encodings. All of these slots are made available for enhancements to the protocol as required and/or for use by future ETM implementations. The M bit in the Normal Data and Full-Visibility Trace encodings could also be used for new data header encodings instead of compression if even more header types are required by future ETM implementations.

1.23 TFO Packet Header Encodings

TFO packets are placed in the FIFO by a TFO cycle (described in Section 5.2.4). Since the decompressor will know when a packet is placed in the FIFO by a TFO, TFO packets have their own header byte encodings, which are completely independent from the encoding space used by PIPESTAT data packets. Here are the TFO packet header encodings:

| Value | Description |
| --- | --- |
| XXXXXX00 | ARM Instruction address |
| XXXXXXX1 | Thumb Instruction address |
| 0RR00010 | Normal TFO packet |
| 1RR00010 | LSM in progress TFO packet |
| XXXXX110 | Reserved |
| XXXX1010 | Reserved |
| XXX10010 | Reserved |

1.23.1 Instruction Address

If TRACEPKT[1:0]!=2'b10 for the first byte of a TFO packet, then this TFO packet consists of just an instruction address. Since a full address is always required, no compression is attempted and the address is always output as a four-byte value. Bit 0 of the address specifies whether it is a Thumb or an ARM instruction address. When a TFO packet consist of just the instruction address, this implies:

CONTEXT ID values are not traced (determined by ContextiDSize, ETM Control register bits [15:14])

The TFO reason code is 2'b00, normal synchronization

If the reason code is non-zero or a CONTEXT ID value is being traced, then one of the following TFO packets is required. TFO packets consisting of just an address are not strictly required for protocol compliance and will not be implemented on ETM10 rev 0.

1.23.2 Normal TFO Packet

Normal TFO packets consist of a header byte followed by 0 to 4 bytes of CONTEXT ID, followed by a 4-byte instruction address. The number of CONTEXT ID bytes traced is statically determined by ETM Control register bits [15:14]. The instruction address is always four bytes and is not compressed. Bit 0 specifies the Thumb bit. The TFO header byte contains the two-bit reason code (labeled as RR in the table above). These reason codes are consistent with the ones used by ETM7 and ETM9 in protocol versions 0 and 1. The reason codes are given in the following table:

| Value | Description |
| --- | --- |
| 00 | Normal synchronization |
| 01 | Tracing has been enabled |
| 10 | Trace restarted after overflow |
| 11 | ARM has exited from debug state |

1.23.3 LSM in Progress TFO Packet

LSM in Progress packets occur only when trace is enabled in the middle of a multiple memory access instruction (LDM, STM, LDC, or STC), and another instruction is currently executing. These packets consist of a header byte followed by 0 to 4 bytes of CONTEXT ID, followed by a 4 byte instruction address for the LSM, followed by 1 to 5 bytes of compressed address for the instruction currently executing. The LSM instruction is a fixed four-byte address with bit 0 specifying the Thumb bit. The current instruction address is compressed using the same technique as branch addresses. (as specified in section 5.3.1) The final instruction address is compressed relative to the full address from the LSM instruction. The next instruction PIPESTAT will be for the instruction pointed to by the second address and tracing begins in the normal way from this point forwards. This packet type is necessary for properly tracing all instructions that touch a particular data address or data value. Without it, the LSM instruction could not be properly traced based on the data address. Note that instructions occurring underneath the LSM are traced, even if tracing was programmed to turn on only during the LSM itself. Similarly, if tracing is turned on due to the instruction address of an instruction that just happens to execute underneath an LSM, a LSM in Progress TFO packet will still be output. For further clarity of the differences between the Normal TFO packet and the LSM in Progress TFO packet, the following table expresses the bytes that should be expected for each case:

| Normal TFO Packet | | LSM in Progress TFO Packet | |
| --- | --- | --- | --- |
| Normal Header | (1 byte) | LSM in Progress header | (1 byte) |
| Context ID | (0–4 bytes) | Context I | (0–4 bytes) |
| Instruction Address | (4 bytes) | LSM Address | (4 bytes) |
| N/A | | Instruction Address | (0–5 bytes) |

ARM10 TRACE Interface

This section describes the signal interface between ARM1020E and ETM10. The majority of the interface is driven by ARM1020E into ETM10. Signal descriptions are divided into custom data path inputs, synthesised control inputs, and ETM outputs. Synthesised control signals can be changed later, but data path signal changes require custom logic rework and, therefore, these cannot be changed late in the design. All input signals are registered immediately inside ETM10 and all outputs are driven directly from the output of a register. The interface consists of a total of 220 signals, which includes 213 inputs and 4 outputs from an ETM10 perspective.

1.24 ETM Data path Inputs

There are four data buses of interest for ETM data tracing: load data, store data, MCR data, and MRC data. All four of these buses are 64 bits in width. Since it is only possible for one of these buses to contain valid data in any given cycle, all four buses are muxed down within ARM1020E to one 64 bit data bus, ETMDATA. ETMDATA is registered within ARM1020E before it is driven to the ETM. ETMDATA is valid in the write (WR) stage of the ARM1020E pipeline. There are four address buses driven from ARM1020E to ETM10. Three of these buses are for instruction addresses and one is for data addresses. The R15 buses are driven to ETM in the execute (EX) stage of the ARM1020E pipeline while the IA and DA address buses are valid in the memory (ME) stage. All data path buses driven to ETM are given in the following table.

| Signal name | Description |
| --- | --- |
| ETMDATA[63:0] | Contains the data value for a Load, Store, MRC, or MCR instruction |

-continued

| Signal name | Description |
|---|---|
| DA[31:0] | Data address bus. Gives the address for every load or store transaction |
| IA[31:1] | Instruction address bus. Gives the address for every instruction fetch. |
| R15BP[31:1] | Address for the branch phantom currently in execute |
| R15EX[31:1] | Address for the instruction currently in execute |

1.25 ETM Control Inputs

1.25.1 ETMCORECTL[23:01]

ETMCORECTL includes a wide variety of control signals that all come from the ARM10 core. These signals are all registered within the core and combined onto this common bus before they are driven to ETM10. The control signals present on this bus and their meaning is given in the following table. All of these are valid in the write stage (WR) of the ARM1020E pipeline, unless specified otherwise.

| Signal name | Description | Qualified by |
|---|---|---|
| ForcePF | Current address on the IA bus is a target for an indirect branch | None |
| ITBit | Thumb Bit for current instruction fetch (valid in ME) | IMnREQ/ForcePF |
| InMREQ | Current address on the IA bus is for a valid instruction fetch | None |
| UpdatesCONTEXTID | Current instruction is updating the CONTEXT ID. | InstValid |
| R15Hold | Stall signal for the address given on R15EX. | None |
| BpValid | When asserted, a branch phantom is present in execute | None |
| BpCCFail | Branch phantom failed it's condition codes | BpValid |
| InstValid | Asserted once per executed instruction. Takes into account mispredicted branches | None |
| CCFail | Current instruction failed it's condition codes | InstValid |
| LSCMInit | Current instruction is a LSM instruction | InstValid |
| Exception | Current instruction is an exception (interrupt, reset, or abort) | InstValid |
| ETMBranch | Last instruction executed is an indirect branch | Asserted before or coincident ForcePF |
| TbitEx | Asserted when ARM1020E is in thumb state (valid in ME) | InstValid |
| PreLoad | Current instruction is a preload and should not be traced | InstValid |
| DnMREQ | Qualifies the Data Address bus, DA | None |
| DMAS[1:0] | Load or store data size | DnMREQ |
| ETMSwap | Indicates a 64 bit store to a big endian memory device. | DnMREQ |
| DnRW | data request read/write signal (0 == read) | DnRW |
| HUMACK | Valid load miss data is present on the data bus this cycle | None |
| LSCM | LSM is in progress in the Load/Store Unit | DnMREQ |
| DABORT | Data request aborted | DnMREQ |
| MISSCNT[1:0] | How many load misses are outstanding. | None, transitions indicate new miss |

1.25.2 ETMDATAVALID[1:0]

This signal qualifies the data driven on the bus ETM-DATA[63:0]. There is one bit for each half of the data bus.

1.26 ETM Outputs

This section describes the outputs that feed back into ARM1020E and what is required from ARM1020E

1.26.1 FIFOFULL

When enable, the ETM output FIFOFULL is asserted whenever there are bytes placed in the FIFO, and it remains asserted until the FIFO is empty. This behaviour is slightly different from ETM7/9, which waited until the FIFO reached a certain specified level before asserting FIFOFULL (see section 4.16) FIFOFULL is used by the core, in this case ARM1020E, to stall the ARM pipeline. This prevents ETM overflow, thus guarantees a complete trace with the side effect of changing slightly the timing of events happening in the core. Note that due to timing considerations, the assertion of FIFOFULL will not result in the immediate stalling of ARM1020E. Therefore, it is sometimes possible, though rare, to still have an overflow even when FIFOFULL is asserted. When this happens, the number of instructions missed will be small since the processor will remained stalled (due to FIFOFULL assertion) while the FIFO is draining.

1.26.2 PWRDOWN

When HIGH this indicates that the ETM is not currently enabled, so the CLK input can be stopped. This is used to reduce power consumption when trace is not being used. At reset PWRDOWN will be asserted until the ETM10 has been programmed. The ARM10200 testchip should use the PWRDOWN output directly to gate the ETM10 CLK input. As previously noted, PWRDOWN will be temporarily disabled on a CONTEXT ID update to allow for an update on ETM10's internal CONTEXT ID shadow register Except for the CONTEXT ID update case, PWRDOWN is changed synchronously to TCLK and will be cleared by the ARM debug tools at the start of a debug session. Since PWRDOWN changes many cycles before trace is enabled. using a TCLK based signal to gate the ETM10 CLK does not cause any metastablilty problems.

1.26.3 DBGRQ

Like previous ETM implementations, ETM10 can be programmed to assert DBGRQ whenever the trigger condition occurs. DGBRQ will remain asserted until DGBACK is observed. DBGRQ should be connected to the ARM1020E external debug request pin, EDBGRQ. No extra support from ARM1020E is required for this ETM output. If the EDBGRQ input is already in use by some other functional block in the ASIC, the multiple DGBRQ signals can be ORed together. Note that enabling debug in this manner is not guaranteed to fall on any particular instruction boundary. Furthermore, the core only recognizes EDGBRQ if ARM10 is currently in hardware debug mode.

1.26.4 TDO

ETM10 uses the same TAP interface wiring as previous ETM versions. The TDO pin is connected to the ARM1020E scan expansion input SDOUTBS. ETM10 registers are accessed via scan chain 6 and are programmed in a manner identical to previous ETM implementations. No extra support from ARM1020E is required for this ETM output.

CONFIGURATIONS

ETM7/9 have been made available in small, medium, and large configurations Medium and large configurations offer more trigger hardware resources and increased FIFO depth at the cost of additional area Different configurations can be chosen for different ASIC applications by simply resynthesising the soft macro with the new configuration ETM10 will offer a similar range of configurations. The following table presents the configurations currently proposed for ETM10. Most trigger resources are identical to ETM7 and ETM9 with the exception of data comparators in the large configuration which was decreased from 8 to 4 due to the larger size of the 64 bit comparators. Increased FIFO sizes in each configuration reflect the need to support the higher instruction throughput (i.e. performance) of ARM1020E. FIFO sizes for each configuration may increase based on area impact and feedback from performance modelling. The gate counts given for ETM10 configurations are estimates based on the initial synthesis of the ETM10 rtl model. These estimated gate counts are likely to be different than what is achieved in the final implementation. A large size ETM10 is what will be placed on the ARM10200 testchip. The corresponding number of resources for ETM9 in each category is given in parentheses for comparison.

| Resource type | Small ETM10 (ETM9) | Medium ETM10 (ETM9) | Large ETM10 (ETM9) |
|---|---|---|---|
| Pairs of address comparators | 1 (1) | 4 (4) | 8 (8) |
| Data comparators | 0 (0) | 2 (2) | 4 (8) |
| Memory map decoders | 0 (4) | 0 (8) | 0 (16) |
| CONTEXT ID comparators | 0 (0) | 1 (0) | 3 (0) |
| Sequencers | 0 (0) | 1 (1) | 1 (1) |
| Counters | 1 (1) | 2 (2) | 4 (4) |
| External inputs | 2 (2) | 4 (4) | 4 (4) |
| External outputs | 0 (0) | 1 (1) | 4 (4) |
| FIFO depth | 15 (9) | 30 (18) | 60 (45) |
| Trace packet width | 4/8/16 (4/8) | 4/8/16 (4/8/16) | 4/8/16 (4/8/16) |
| Approximate Gate count | 35k (25k) | 50k (35k) | 75k (60k) |
| Approximate Area (0.25 process) | 1.8 mm$^2$ (1.1 mm$^2$) | 2.3 mm$^2$ (1.58 mm$^2$) | 4.7 mm$^2$ (3.1 mm$^2$) |
| Approximate Area (0.18 process) | 1.0 mm$^2$ (0.62 mm$^2$) | 1.26 mm$^2$ (0.9 mm$^2$) | 2.5 mm$^2$ (1.7 mm$^2$) |

Although a particular embodiment has been described herein, it will be apparent that the invention is not limited thereto, and that many modifications and additions thereto may be made within the scope of the invention. For example, various combinations of the features of the following dependent claims can be made with the features of the independent claims without departing from the scope of the present invention.

We claim:

1. Apparatus for processing data and operable to access a memory, comprising:
a processing circuit having an operating system associated therewith and being operable to execute sequences of processing instructions, the processing circuit having multiple states of operation, the manner of access to an address space of said memory being dependent upon a state of operation, each state of operation having a non-zero number of said sequences associated therewith, with each state of operation being assigned a context identifier by the operating system to identify the state of operation; and
logic for facilitating debugging of said sequences of processing instructions executed by the processing circuit including:
control logic, responsive to control parameters, to perform predetermined actions to facilitate debugging; and
triggering logic for generating the control parameters dependent on data received from the processing circuit indicative of the processing being performed by the processing circuit, the triggering logic comprising at least one context identifier comparator for comparing a context identifier provided within the data received from the processing circuit with a predetermined context identifier, and to generate a signal indicating whether that context identifier matches the predetermined context identifier.

2. Apparatus as claimed in claim 1, wherein the logic for facilitating debugging of sequences of processing instructions, is a tracing circuit, the control logic being operable to generate a stream of trace data from the data received from the processing circuit in dependence on the control parameters from the triggering logic.

3. Apparatus as claimed in claim 2, wherein the triggering logic further comprises at least one address comparator for comparing an address provided within the data received from the processing circuit with a predetermined address and to generate an output signal indicating whether that address matches the predetermined address, the triggering logic further including conditioning logic to optionally enable the output signal from the address comparator to be conditioned on the output of one of said at least one context identifier comparators, such that a signal indicating a match of the address will only be output from the conditioning logic if a match of the context identifier was also indicated by the context identifier comparator.

4. Apparatus as claimed in claim 3, comprising a plurality of said context identifier comparators, and a plurality of said address comparators with associated conditioning logic to enable those address comparators to have their output signal conditioned an the output of one of said context identifier comparators.

5. Apparatus as claimed in claim 4, wherein each context identifier comparator is associated with a predetermined one of said address comparators.

6. Apparatus as claimed in claim 4, wherein each address comparator has a selector associated therewith arranged to receive the output from multiple of said context identifier comparators, the selector being driven by a select signal to determine which context identifier comparator's output is to be used to condition the output of the associated address comparator.

7. Apparatus as claimed in claim 3, comprising a plurality of said address comparators, at least one of the address comparators including mode change logic to enable that address comparator to be used as said context identifier comparator to generate an output used to condition the output signal from another of said address comparators.

8. Apparatus as claimed in claim 7, wherein the mode change logic comprises a multiplexer arranged to receive an address and a context identifier provided within the data received from the processing circuit, and to select the context identifier if the address comparator is to be used as a context identifier comparator.

9. Apparatus as claimed in claim 1, wherein the triggering logic comprises one or more logic circuits used to detect predetermined events, the control circuit being arranged to cause the processing circuit to halt execution of a current sequence of processing instructions to enable debugging to be performed.

10. Apparatus as claimed in claim 9, wherein the control logic further causes the processing circuit to execute an alternative sequence of processing instructions to perform debugging.

11. Apparatus as claimed in claim 10, wherein the predetermined context identifier within the context identifier comparator identifies a state of operation of the processor upon detection of which it is desired to invoke the alternative sequence of processing instructions, the alternative sequence of processing instructions being arranged to execute in a privileged mode of the processor, on determination of a match by the context identifier comparator, the triggering logic being arranged to generate a control parameter provided that the processor is not in the privileged mode, the control logic being responsive to the control parameter to cause the processing circuit to execute the alternative sequence of processing instructions to perform debugging.

12. Apparatus as claimed in claim 9, wherein the triggering logic further comprises a plurality of address comparators for comparing an address provided within the data received from the processing circuit with a predetermined address and to generate an output signal indicating whether that address matches the predetermined address, the triggering logic further including conditioning logic to enable the output signal from the address comparator to be conditioned on the output of one of said at least one context identifier comparators, such that a signal indicating a match of the address will only be output from the conditioning logic if a match of the context identifier was also indicated by the context identifier comparator.

13. Apparatus as claimed in claim 12, wherein at least one of the address comparators includes mode change logic to enable that address comparator to be used as said context identifier comparator to generate an output used to condition the output signal from another of said address comparators.

14. Apparatus as claimed in claim 13, wherein the mode change logic comprises a multiplexer arranged to receive an address and a context identifier provided within the data received from the processing circuit, and to select the context identifier if the address comparator is to be used as a context identifier comparator.

15. Apparatus as claimed in claim 1, wherein the processing circuit operates in a multi-tasking environment, and the multiple states of operation are multiple processes.

16. Apparatus as claimed in claim 1, wherein the processing circuit operates in a single tasking environment using processing instructions received from a memory, the address space of the memory using overlays to enable sequences of processing instructions to occupy overlapping regions in the address space, and the state of operation identifying the overlay or combination of overlays being used.

17. A method of facilitating debugging of sequences of processing instructions executed by a processing circuit having an operating system associated therewith, the processing circuit executing sequences of processing instructions accessible from a memory, the processing circuit having multiple states of operation, the manner of access to an address space of said memory being dependent upon a state of operation, each state of operation having a non-zero number of said sequences associated therewith, with each state of operation being assigned a context identifier by the operating system to identify the state of operation, said method comprising:

generating control parameters dependent on data received from the processing circuit indicative of the processing being performed by the processing circuit;

a context identifier provided within the data received from the processing circuit with a predetermined context identifier and generating a signal indicating whether that context identifier matches the predetermined context identifier; and responsive to the generated control parameters, performing predetermined actions to facilitate debugging.

18. A computer program product carrying a computer program for controlling an apparatus in accordance with the method of claim 17.

19. Method as claimed in claim 17, further comprising:

generating a stream of trace data from the data received from the processing circuit in dependence on the generated control parameters.

20. Method as claimed in claim 19, further comprising:

comparing an address provided within the data received from the processing circuit with a predetermined address and generating an output signal indicating whether that address matches the predetermined address, and optionally enabling output signal to be conditioned on the context identifier comparison such that a signal indicating a match of the address will only be output if a match of the context identifier was also indicated by the context identifier comparison.

21. Method as claimed in claim 17, further comprising:

halting execution of a current sequence of processing instructions to enable debugging.

22. Method as claimed in claim 21 further comprising:

executing an alternative sequence of processing instructions to perform debugging.

23. Method as claimed in claim 22, wherein the predetermined context identifier within the context identifier comparator identifies a state of operation of the processor upon detection of which it is desired to invoke the alternative sequence of processing instructions, the alternative sequence of processing instructions being arranged to execute in a privileged mode of the processor, on determination of a context identifier comparison, the match method further comprising:

generating a control parameter provided that the processor is not in the privileged mode, and in response to the control parameter, executing the alternative sequence of processing instructions to perform debugging.

24. Method as claimed in claim 17, wherein the processing circuit operates in a multi-tasking environment, and the multiple states of operation are multiple processes.

25. Method as claimed in claim 17, wherein the processing circuit operates in a single tasking environment using processing instructions received from a memory, the address space of the memory using overlays to enable sequences of processing instructions to occupy overlapping regions in the address space, and the state of operation identifying the overlay or combination of overlays being used.

* * * * *